United States Patent
Mondal

(10) Patent No.: US 9,882,422 B2
(45) Date of Patent: Jan. 30, 2018

(54) ENERGY EFFICIENT ELECTRICAL SYSTEMS AND METHODS FOR MODULAR DATA CENTERS AND MODULAR DATA PODS

(71) Applicant: Inertech IP LLC, Danbury, CT (US)

(72) Inventor: Subrata K. Mondal, South Windsor, CT (US)

(73) Assignee: Inertech IP LLC, Danbury, CT (US)

( * ) Notice: Subject to any disclaimer, the term of this patent is extended or adjusted under 35 U.S.C. 154(b) by 447 days.

(21) Appl. No.: 14/595,688

(22) Filed: Jan. 13, 2015

(65) Prior Publication Data

US 2015/0194842 A1 Jul. 9, 2015

Related U.S. Application Data

(63) Continuation of application No. PCT/US2013/050575, filed on Jul. 15, 2013.
(Continued)

(51) Int. Cl.
*H02J 1/10* (2006.01)
*H02J 9/06* (2006.01)
(Continued)

(52) U.S. Cl.
CPC .......... *H02J 9/06* (2013.01); *G06F 1/30* (2013.01); *H02J 1/10* (2013.01); *H02J 9/04* (2013.01); *Y10T 307/344* (2015.04)

(58) Field of Classification Search
CPC ....... H02J 9/06; H02J 9/04; H02J 1/10; G06F 1/30
(Continued)

(56) References Cited

U.S. PATENT DOCUMENTS 5,694,312 A 12/1997 Brand et al.
6,617,708 B2 9/2003 Boost
(Continued)

FOREIGN PATENT DOCUMENTS

JP 2010074941 A 4/2010

OTHER PUBLICATIONS

International Preliminary Report issued in corresponding PCT Application No. PCT/US2013/050575 dated Jan. 13, 2015.

*Primary Examiner* — Ryan Jager
(74) *Attorney, Agent, or Firm* — Carter, DeLuca, Farrell & Schmidt, LLP

(57) ABSTRACT

An efficient, modular, direct current (DC) uninterruptible power supply (UPS) for at least one server of a data center is disclosed. The single-conversion DC UPS includes an AC-DC converter, an energy storage device electrically coupled to the output of the AC-DC converter, and a single conversion server supply DC-DC converter electrically coupled to the AC-DC converter and the energy storage device, which may be a low-voltage lithium-ion battery or combined with an ultra capacitor. The DC UPS may be incorporated into a UPS system for a data center including a plurality of server rack assemblies and a plurality of cooling distribution units (CDUs). The UPS system includes an electric generator, an AC UPS electrically coupled between the electric generator and the plurality of CDUs, and a plurality of DC UPSs coupled between the electric generator and the plurality of server rack assemblies.

15 Claims, 21 Drawing Sheets

Related U.S. Application Data

(60) Provisional application No. 61/728,073, filed on Nov. 19, 2012, provisional application No. 61/671,641, filed on Jul. 13, 2012.

(51) Int. Cl.
  *H02J 9/04* (2006.01)
  *G06F 1/30* (2006.01)

(58) Field of Classification Search
  USPC .......................................................... 307/23
  See application file for complete search history.

(56) References Cited

U.S. PATENT DOCUMENTS

| | | | |
|---|---|---|---|
| 7,352,083 B2 | 4/2008 | Nielsen et al. | |
| 7,495,415 B2 | 2/2009 | Kanouda et al. | |
| 7,560,831 B2 | 7/2009 | Whiffed et al. | |
| 7,561,411 B2 | 7/2009 | Johnson, Jr. | |
| 8,080,900 B2 | 12/2011 | Corhodzic et al. | |
| 8,384,244 B2 | 2/2013 | Peterson et al. | |
| 8,624,433 B2 | 1/2014 | Whitted et al. | |
| 8,866,447 B2 | 10/2014 | Wang | |
| 2003/0052543 A1 | 3/2003 | Boost | |
| 2003/0222618 A1 | 12/2003 | Kanouda et al. | |
| 2003/0231009 A1* | 12/2003 | Nemoto | H02J 7/027 323/276 |
| 2005/0036248 A1 | 2/2005 | Klikic et al. | |
| 2005/0146223 A1* | 7/2005 | Kanouda | G06F 1/30 307/66 |
| 2006/0186739 A1* | 8/2006 | Grolnic | G06F 1/30 307/64 |
| 2007/0217125 A1 | 9/2007 | Johnson | |
| 2007/0278860 A1 | 12/2007 | Krieger et al. | |
| 2011/0148197 A1* | 6/2011 | Hernandez | H02J 9/061 307/26 |
| 2011/0304211 A1 | 12/2011 | Peterson et al. | |
| 2012/0098342 A1 | 4/2012 | Johnson, Jr. | |
| 2014/0122906 A1 | 5/2014 | Whitted et al. | |

* cited by examiner

ENERGY EFFICIENT ELECTRICAL SYSTEMS AND METHODS FOR MODULAR DATA CENTERS AND MODULAR DATA PODS

BACKGROUND

1. Technical Field

This present disclosure provides a unique design solution using a direct current (DC) uninterruptible power supply (UPS) and server power supply with DC input voltage for the design of high-efficiency, cost-effective modular data centers.

The present disclosure also provides unique design solutions for high density modular data centers by using either: (i) an alternating current (AC) uninterruptible power supply (UPS) in energy saver (ES) mode; or (ii) a direct current (DC) UPS in conjunction with a server power supply with a DC input voltage.

2. Background of Related Art

There is a large demand for efficient Data Centers to store large amounts of data due to the emergence of Web 2.0-enabled businesses such as financial, e-commerce, pharmaceutical, or multi-media businesses. Indeed, information technology (IT) growth is outstripping Moore's law, which is a rule of thumb where the number of transistors that can inexpensively be placed in an integrated circuit (IC) doubles approximately every two years. However, in the past many years, major energy efficiency improvements and technological innovation has not been achieved for both electrical and mechanical infrastructure of the data center industry, even as computing hardware and software has become much more efficient. Thus, efficient computing hardware and software sits on an inefficient electrical and mechanical infrastructure. This inefficient infrastructure represents significant capital expenditure (CAPEX) and operational expenditure (OPEX) cost problems for businesses. Data centers and businesses with mission critical data storage requirements need a high-efficient and reliable infrastructure systems to reduce overall total cost of ownership (TCO).

By some estimates, the demand for data storage doubles approximately every 18 months, which results in an annual growth rate of approximately 150% for the next 5 years. This increase in demand for data storage is linearly proportional to the increase in the amount of data being processed, which is being driven by the increase in mobile data traffic and data processing of large, medium, and small business operations.

Modularity and flexibility are key elements in allowing for a data center to grow and change over time. A modular data center may consist of data center equipment contained within shipping containers or similar portable containers. But it can also be described as a design style in which components of the data center are prefabricated and standardized so that they can be constructed, moved or added to quickly as needs change.

The digital storage market doubles every 18 months, which translates to an annual growth rate of approximately 150% for the next 5 years. Standard brick-and-mortar data centers require significant capital expenditure (CAPEX) and operational expenditure (OPEX), which cause problems for businesses. However, modular data centers require approximately 50% lower construction costs in comparison to standard brick-and-mortar data centers. Also, modular data centers can be deployed within 12 to 15 weeks in comparison to 2 years needed by standard brick-and-mortar data centers. Existing businesses in need of additional data storage require highly efficient and reliable modular data centers to reduce the overall total cost of ownership (TCO).

Various companies including IO, HP, Dell, Google, and Colt supply modular data centers. However, these modular data centers are in some respects rudimentary with respect to energy efficiency. Moreover, the cooling mechanisms of these modular data centers are also rudimentary and inefficient with respect to energy efficiency. In addition, the electrical infrastructure is inefficient or does not have a redundant supply path. Most electrical infrastructure uses standard shipping containers for storage applications. Since it assumed in the art that efforts at improving efficiency will result in a decrease in reliability, comparatively little attention has been focused on improving the power efficiency of the data centers while at the same time maintaining the same or even greater levels of reliability.

With respect to the large conventional modular data centers, FIG. 1A shows an existing data center 10 with a centralized alternating current (AC) UPS 40, i.e., a double conversion AC-DC/DC-AC, and double conversion AC-DC/DC-DC server power supplies 45a-45n with an AC input and a DC output. Information technology (IT) loads 55 and mechanical loads 60 (e.g., the energy required by cooling systems) of the data center 10 are powered entirely by a utility feed 20 via an on-line double conversion AC-UPS 40 through a step-down transformer 35. A generator 15 starts to operate once a disturbance in the utility 20, e.g., a loss of all or a portion of the electricity provided by the utility feed 20, is more than approximately two seconds. During a disturbance in the utility feed 20, surge protector 25 dampens the disturbance. For disturbances beyond a pre-determined acceptable level that are beyond the dampening capabilities of the surge protector 25, the IT loads 55 and mechanical loads 60 are powered by the AC UPS 40 via one or more internal batteries and an internal DC-AC inverter section, neither of which are shown but are part of AC UPS 40.

Once the generator 15 has reached its reference speed and stabilized, the transfer switch 30 shifts the primary power source from the utility feed 20 to the generator 15. Thereafter, the IT loads 55 and mechanical loads 60 are entirely powered by the generator 15 via the on-line UPS 40. The internal batteries (not shown) of AC UPS 40 are also recharged by the generator 15. Once the disturbance in the utility feed 20 is no longer present, the IT loads 55 and mechanical loads 60 are shifted from the generator 15 to the UPS system 40. Ultimately, the transfer switch 30 shifts the primary power source from the UPS system 40 back to the utility feed 20.

A mechanical cooling system (not shown) is in thermal communication with each of a plurality of IT server racks 50a-50n, and circulates a coolant that removes heat generated by the plurality of IT server racks 50a-50n. The coolant is pumped by a cooling distribution unit (CDU) 65a-65n that includes a heat exchanger that allows the system to use refrigerant cooling. Each CDU 65a . . . 65n may support approximately 350 kW of IT load capacity, i.e., part of the mechanical load 60.

Turning now to FIGS. 2 and 3, there is illustrated a data center 100 having AC UPSs 145a, 145b and a server power supply with an AC input. During normal operation, the IT or server loads 50 (50a . . . 50n) and mechanical loads 65a-1 . . . 65n-1 and 65a-2 and 65n-1 of data center 100 (see FIG. 3) are powered entirely by the utility power feeders 105a, 105b (see FIG. 2) via on-line double conversion AC UPSs 145a, 145b that are similar to the centralized AC UPS 40 described above with respect to FIG. 1A. The utility power source is usually connected to the data center 100 through the first utility power feeder 105a. The second utility power feeder 105b is normally open at switch 105' and supplies the data center load (both IT and mechanical loads 55, 60 as described above with respect to FIG. 1A) in case the first utility power feeder 105a malfunctions. The utility power feeders 105a and 105b supply power through switchgear 110 to feed step-down transformer 115. The voltage output of step-down transformer 115 is supplied to a first common bus 120. Power feed 122, in turn, supplies power from the first common bus 120 to a second common bus 135.

In turn, power feed 150 supplies power from the second common bus 135 to first primary common bus 150a via branch bus line 1501 and to second primary common bus 150b via branch bus line 1502. Power from first primary common bus 150a is supplied in turn to first secondary common bus 162a and also to second secondary common bus 162b via feeds 152a and 152b, respectively. Similarly, power from second primary common bus 150b is supplied in turn to first secondary common bus 162a and also to second secondary common bus 162b via feeds 154a and 154b, respectively.

Power is supplied to transformers 170a and 170c from first secondary common bus 162a via feed 164a and split feed 164a1 to transformer 170a and via split feed 164a2 to transformer 170c. Similarly, power is supplied to transformers 170b and 170d from second secondary common bus 162b via feed 164b and split feed 164b1 to transformer 170b and via split feed 164b2 to transformer 170d. Power is supplied directly from first secondary common bus 162a via feed 166a to transformer 170e and directly from secondary common bust 162b via feed 166b to transformer 170f.

When a disturbance in the utility power feeders 105a, 105b occurs that is more than about two seconds, the generators 140a, 140b start. The disturbance is detected in bus 135 and generator 140a supplies power to feed 1351 through AC UPS 145a while generator 140b supplies power to feed 1352 through AC UPS 145b. AC UPS 145a then supplies power to bus 150a via branch bus feeder 13511 and to bus 150b via branch bus 13512. Similarly, AC UPS 145b then supplies power to bus 150a via branch bus feeder 13521 and to bus 150b via branch bus 13522.

In some cases, only one of generators 140a and 140b may start depending on the magnitude of the IT or server loads 50 (50a ... 50n) and mechanical loads 65a-1 ... 65n-1 and 65a-2 ... 65n-1. When the generators 140a, 140b start, the IT and mechanical loads are still powered by the UPSs 145a, 145b via inverter 430 and battery 410 (see FIG. 4). When the generators 140a, 140b have reached their reference speeds and stabilized, the transfer switch (not shown) shifts the primary power source from the utility power feeder 105a to the generators 140a, 140b. Thereafter, the loads IT or server loads 50 (50a ... 50n) and mechanical loads 65a-1 ... 65n-1 and 65a-2 ... 65n-2 are entirely powered by the generators 140a, 140b via the UPSs 145a, 145b. The UPS batteries 410 (See FIG. 4) are recharged by power generators 140a, 140b. When the disturbance in the utility power feeder 105a is no longer present, the loads 55 and 60 are shifted from the generators 140a, 140b to the UPSs 145a, 145b and ultimately transfer switch shifts the primary power source to the utility power feeder 105a. Transformer 115 steps down the voltage from the utility feed 105a.

An auxiliary distribution source 160 and transformer 165, which are electrically coupled in series via feed bus 1601 and then via split feed bus 16011 with first primary common bus 150a and then via split feed bus 16012 with second primary common bus 150b, supply power to the loads IT or server loads 50 (50a ... 50n) and mechanical loads 65a-1 ... 65n-1 and 65a-2 ... 65n-2 upon failure of the UPSs 145a, 145b and/or generators 140a, 140b. Wrap up lines 125a, 125b, which are electrically coupled to first common bus 120, provide an alternative path for supplying power to the loads if a problem arises in the AC UPSs 145a, 145b and/or generators 140a, 140b. Wrap up lines 125a and 125b include switches 130a and 130b, respectively, which are normally open and provide power if other lines electrically coupled to main switch gear 120 fail. Switch gears 162a and 162b allow for either of the UPSs 145a, 145b and/or either of the generators 140a, 140b to supply all or a part of the power for the entire IT or server loads 50 (50a ... 50n) and mechanical loads 65a-1 ... 65n-1 and 65a-2 ... 65n-2 (see FIG. 1A).

Transformers 170c, 170d supply power to IT or server loads 50 (50a ... 50n) via switches 185a and 185b, respectively. If either transformer 170c or 170d fails, then tie 187 assists in supplying power to bus 190a or 190b. Mechanical transformers 170a, 170b supply power to mechanical (CDU) loads 65a-1 ... 65n-1 and 65a-2 ... 65n-2 via switches 175a and 175b, respectively (see FIG. 1A). If either transformer 170a or 170b fails, then tie 177 assists in supplying power to bus 180a or 180b. Administration transformers 170e, 170f supply power to an administration building load (not shown) via switches 195a and 195b respectively. If either transformer 170e or 170f fails, then tie 197 assists in supplying power to the administration building load.

Either transformer 170a or 170b has sufficient capacity to handle the entire mechanical (CDU) loads 65a-1 ... 65n-1 and 65a-2 ... 65n-2 alone in case of failure of the other. However, transformers 170a and 170b generally work in combination, each carrying 50% of the load. Similarly, either transformer 170c or 170d has sufficient capacity to handle the entire IT or server loads 50 (50a ... 50n) alone in case of failure of the other. However, transformers 170c and 170d generally work in combination, each carrying 50% of the load. Buses 190a and 190b are for IT or server loads 50 (50a ... 50n) and buses 180a and 180b are for mechanical/CDU loads 65a-1 ... 65n-1 and 65a-2 ... 65n-2.

FIG. 3 shows connections between buses 180a, 180b and mechanical/CDU loads 65a-1 ... 65n-1 and 65a-2 ... 65n-2 and between buses 190a, 190b and IT load 50. More particularly, mechanical CDU loads 65a-1 ... 65n-1 are supplied power from bus 180a and CDU loads 65a-2 ... 65n-2 are supplied power from bus 180b.

IT load 50 includes a plurality of server rack assemblies 50a ... 50n, which are separated from each other to define hot aisles 210 and cold aisles 220. Each server rack assembly 50a ... 50n is electrically coupled to buses 190a and 190b via server power supplies 500 (see FIG. 5). Each server power supply 500 includes an AC-DC converter 520a ... 520n electrically coupled in series to a DC-DC converter 510a ... 510n having outputs 530a, 530b, 530c, 530d electrically coupled to the respective IT or server loads 50a ... 50n.

FIG. 4 is a block diagram of an AC UPS 400 that can be used as the AC UPSs 145a, 145b of FIG. 2. The AC UPS 400 includes an AC-DC converter 440, a DC-DC converter 420, a battery 410, and a DC-AC inverter 430. As shown, the DC-DC converter 420 and the battery 410 are electrically coupled in parallel between the AC-DC converter 440 and the DC-AC inverter 430. The AC-DC converter 440 receives a high AC voltage via a plurality of power lines 460a ... 460c and converts the high AC voltage to a high DC voltage. The high DC voltage is supplied to both the bidirectional DC-DC converter 420 and the DC-AC inverter 430. The DC-DC converter 420, which is a buck-boost converter, steps down the high DC voltage to a lower voltage that is suitable for charging lead acid battery 410 (e.g., an intermediate voltage).

In this case, high DC voltage is defined as about 1000 V and an intermediate voltage for the battery 410 is about 300 V DC to about 600 V DC. The three-phase inverter 430 also includes three outputs, that is, 3-phase 480 V AC outputs 450a, 450b, 450c. It should be noted that the individual 3-phase 480 V AC outputs 450a, 450b, 450c are not explicitly shown in FIGS. 2 and 3 but are represented as single phase lines in a single line diagram. The UPS efficiency in double-conversion mode is around 94%-96% at nominal load.

During normal operation, the DC-AC inverter 430 converts the high DC voltage from the AC-DC converter 440 into an AC voltage, which is supplied to the server power supplies 500 via step-down transformers 170c, 170d of FIG. 2. When there is a disturbance in the high AC voltage supplied by a utility to the AC-DC converter 440, the DC-DC converter 420 converts the voltage of the battery 410 into a high DC voltage, which is supplied to the DC-AC inverter 430. The AC UPS 400 is a double-conversion AC UPS because it performs two electrical conversions via the AC-DC converter 440 and the DC-AC inverter 430.

FIG. 5 shows server power supply 500, which includes two AC inputs (single phase) 540a, 540b from respective IT buses 190a, 190b (see FIG. 3). The AC-DC converter 520 converts a single phase AC voltage of the AC inputs 540a, 540b to an intermediate DC voltage. DC-DC converter 510 converts the intermediate DC voltage into multiple low DC voltages 530a . . . 530d. For example, the plurality of DC-DC converters 510a . . . 510n can supply approximately 3.3 VDC, 5 VDC, 12 VDC, and −12 VDC via phase output lines 530a, 530b, 530c, and 530d, respectively, to the respective servers 50a . . . 50n as shown in FIG. 3.

One disadvantage of the existing data center 100 is the double-conversion AC UPS 400. The two electrical conversions performed by the AC UPS 400 increase losses and increase power usage effectiveness (PUE) of the data center. PUE is a measure of how efficiently a data center uses its power. Specifically, PUE is a measure of how much of the power is actually used by the servers of the data center in contrast to the power used for cooling and other overhead functions of the data center. In other words, PUE is the ratio of the total amount of power used by a data center to the power delivered to the servers of the data center so that PUE is greater than 1.0, which is the ideal PUE value. Thus, the lower the PUE, the more efficient is the data center.

Another disadvantage of the existing data center 100 is the multiple electrical conversions (AC-DC/DC-DC) performed by the server power supply 500 (FIG. 5), which also increases losses and increases PUE. Therefore, the overall losses introduced by the AC UPS 400 and the server power supply 500 are high in the existing data center 100.

Alternatively, FIG. 1B shows a data center system 70 including a modular, scalable, double-conversion UPS system 72 and server power supplies with AC input voltages. More particularly, the server power supplies of the modular UPS system 72 include a plurality of in-line modular AC UPSs 75a . . . 75n that are each electrically coupled between the transformer 35 and a respective one of the plurality of server power supplies 45a . . . 45n. The modular UPS system 72 also includes a plurality of in-line AC UPSs 85a . . . 85n that are each electrically coupled between the transformer 35 and a respective one of the plurality of CDUs 65a . . . 65n.

The efficiency of the modular UPS system 72 is high because of the higher loading factor of the modular UPS system 72 of FIG. 1B as compared to the centralized UPS system 40 of FIG. 1A, where the initial loading factor may not be high. Normally, the capacity of the centralized UPS system 40 of FIG. 1A is selected based on future load demand.

FIG. 6 illustrates an existing modular data center 1100 powered by a utility feed 1110 (e.g., 480 V L-L 3-phase AC utility feed). Multiple IT or server loads 1140a . . . 1140n are supplied by a 3-phase double conversion on-line UPS 1120. DC power is supplied to the IT loads 1140a . . . 1140n from, for example, 277 V L-N, 1-phase double conversion AC-DC/DC-DC converters 1130a . . . 1130n. The single phase (L-N) is supplied via the UPS 1210. The DC-DC output of the server power supplies or converters 1130a . . . 1130n is supplied to the IT loads 1140a . . . 1140n. A cooling mechanism 1115 (or mechanical load) is supplied by the utility feed 1110 (e.g., 480 V L-L 3-phase AC).

The cooling mechanism 1115 may employ Computer Room Air Conditioning (CRAC) cooling which is a central unit within the modular data center 100 that is relatively inefficient.

FIG. 7 illustrates another existing modular data center 1200 powered by utility feed 1110 (e.g., 480 V L-L 3-phase AC). The AC inputs of the server power supplies 1130a . . . 1130n are powered by a plurality of rack mountable 1-phase double conversion on-line AC UPSs 1120a . . . 1120n. In other words, each server power supply 1130a . . . 1130n is directly connected to an AC UPS 1120a . . . 1120n, in contrast to the system 1100 illustrated in FIG. 6. As such, every IT load 1140a . . . 1140n is powered by separate and distinct AC UPSs 1120a . . . 1120n. The system 1200 may also include a CRAC cooling mechanism 1115, as described above with reference to FIG. 6.

FIG. 8 illustrates a block diagram of 1-phase double conversion on-line AC UPSs 1120a . . . 1120n of FIG. 7. AC UPSs 1120a . . . 1120n each includes a 1-phase AC-DC converter 1310, a DC-DC converter 1320, a battery 1330, and a DC-AC 1-phase inverter 1340. As compared to the AC UPS 400 in FIG. 4, the AC UPS 400 is a 3-phase version of a double-conversion AC UPS whereas AC UPSs 1120a . . . 1120n are single phase versions of the double conversion AC UPS 400. The 3-phase AC UPS 400 has a larger power rating and cannot be mounted on the server racks 50a . . . 50n. However, 1-phase AC UPSs 1120a . . . 1120n may be mounted on the server rack 50a . . . 50n as they have a smaller power rating.

As shown in FIG. 8, the DC-DC converter 1320 and the battery 1330 are electrically coupled in parallel between the AC-DC converter 1310 and the DC-AC inverter 1340. The AC-DC converter 1310 receives a 1-phase medium AC voltage (e.g., 277 V AC) via a plurality of power lines 1405a, 1405b and converts the medium AC voltage to a medium DC voltage. The medium DC voltage is supplied to both the bidirectional DC-DC converter 1320 and the 1-phase DC-AC inverter 1340. The inverter 1340 also includes two outputs, that is, outputs 1445a, 1445b. The DC-DC converter 1320, which is a buck-boost converter, steps down the medium DC voltage to a lower voltage that is suitable for charging the lead acid battery (e.g., an intermediate voltage).

In view of foregoing, there are multiple conversions required for the supply of electrical power in conventional modular data centers and modular data pods.

SUMMARY

In one aspect, the systems, and corresponding methods, of the present disclosure relate to a modular system for supplying DC power to at least one server. The modular system includes a DC uninterruptible power supply (UPS) including: an AC-DC converter and an energy storage device electrically coupled to the output of the AC-DC converter. The modular system also includes a DC-DC converter directly connected to the output of the AC-DC converter of the DC UPS and configured to supply DC power to the at least one server.

The energy storage device may be a low-voltage battery. The low-voltage battery may be a 12 V battery, a 24 V battery, or a 48 V battery. The energy storage device may be a lithium-ion battery or a combination of a lithium-ion battery and a ultra-capacitor.

The DC-DC converter may supply a plurality of DC voltages to the at least one server. The single power conversion may be performed by a server power supply between the energy storage device and the at least one server.

In another aspect, the present disclosure features a system for supplying power to a data center including a plurality of server rack assemblies and a plurality of cooling distribution units (CDUs) in thermal communication with the plurality of server rack assemblies. The system includes an electric generator, an AC uninterruptible power supply (UPS) electrically coupled in energy storage mode between the electric generator and the plurality of CDUs and a plurality of DC UPSs, each of which is electrically coupled between the electric generator and a respective one of the plurality of server rack assemblies.

Each of the plurality of DC UPSs may include an AC-DC converter and an energy storage device electrically coupled in parallel to the output of the AC-DC converter. Each of the plurality of DC UPSs may further include a high-frequency DC-DC converter for a power supply of at least one server in a respective server rack assembly, and the high-frequency DC-DC converter may include a plurality of MOSFETs in an H-bridge configuration and a zero-voltage switching controller electrically coupled to the plurality of MOSFETs to output a plurality of DC voltages from the high-frequency DC-DC converter. The high frequency may be between about 80 kHz to about 120 kHz.

The energy storage device may be a low-voltage battery. The low-voltage battery may be a 12 V battery, a 24 V battery, or a 48 V battery. The energy storage device may be a lithium-ion battery or a combination of a lithium-ion battery and an ultra-capacitor.

The AC UPS may be configured in an offline energy saver mode such that power is supplied from the AC UPS to the plurality of CDUs if a disturbance occurs in a utility power source that normally supplies power to the plurality of CDUs. A single power conversion may be performed between the energy storage device and the at least one server in the respective server rack assembly.

Each of the plurality of DC UPSs may be connected to a respective load line of a plurality of load lines. One of the plurality of DC UPSs may be connected to one load line of a plurality of load lines.

In another aspect, the AC UPS in ES mode includes: an AC-DC converter, an energy storage device, and a bidirectional DC-DC converter electrically coupled in series with the positive terminal of the energy storage device. The series combination of the energy storage device and the DC-DC converter is coupled in parallel to the AC-DC converter. The AC UPS in ES mode also includes a DC-AC inverter electrically coupled in parallel to the series combination of the energy storage device and the DC-DC converter.

The battery/energy storage device may be a medium voltage battery. The medium voltage battery may supply a voltage between 250 V and 450 V.

Each of the plurality of DC UPSs may be connected to a respective load line of a plurality of load lines. One of the plurality of DC UPSs may be connected to one load line of a plurality of load lines.

DETAILED DESCRIPTION

When introducing elements of the present disclosure, the articles "a," "an," "the" and "said" are intended to mean that there are one or more of the elements. The terms "comprising," "including," and "having" are intended to be inclusive and mean that there may be additional elements other than the listed elements.

The present disclosure relates to a DC UPS and power supply system with DC input voltage for a server load that improves overall data center efficiency as compared to data centers with AC UPSs and server power supplies with AC inputs. The present disclosure also relates to a modular UPS system design that has lower invested capital (CAPEX) and operating energy costs (OPEX). The capital cost of the modular kW-capacity DC UPS is significantly reduced in comparison to centralized MW-capacity AC UPSs.

Load capacity utilization of the data center is high because of the modular design based on IT load requirements. Higher overall data center efficiency is achieved because the system can be operated at full IT loads. The DC UPS system is compact in comparison to the conventional AC UPS systems because there is no inverter (DC-AC) section that leads to lower UPS losses. The efficiency in the DC-DC server power supply is higher as there is no AC-DC converter, which leads to lower losses in comparison to typical server power supplies with AC inputs.

The server power supply with a DC input voltage according to the present disclosure uses a high-frequency zero-voltage switching (ZVS) technique with a compact high-efficiency planar transformer to improve power supply efficiency and to make the server power supply compact. Also, low-voltage (LV) lithium-ion batteries can be used for the DC UPS. The LV lithium-ion batteries may supply 12 V, 24 V, or 48 V, for example. Thus, there is no need for high-voltage (HV) lead-acid batteries as in AC UPSs. The topology according to the present disclosure can be used for Tier 2, Tier 3, and Tier 4 systems in an N+1 configuration.

The embodiments of the modular data pod system and the associated electrical systems of the present disclosure provide significant improvements over conventional modular pod data centers and their electrical systems. Two different electrical topologies are described herein.

The more efficient topology uses an alternating current (AC) uninterruptible Power Supply (UPS) in an energy saver mode such that a hybrid configuration results in on-line dual conversion DC power supplies supplying power to IT server loads while off-line AC UPSs provide power to CDU loads, as described below with reference to FIGS. 9-13.

Figure 9:
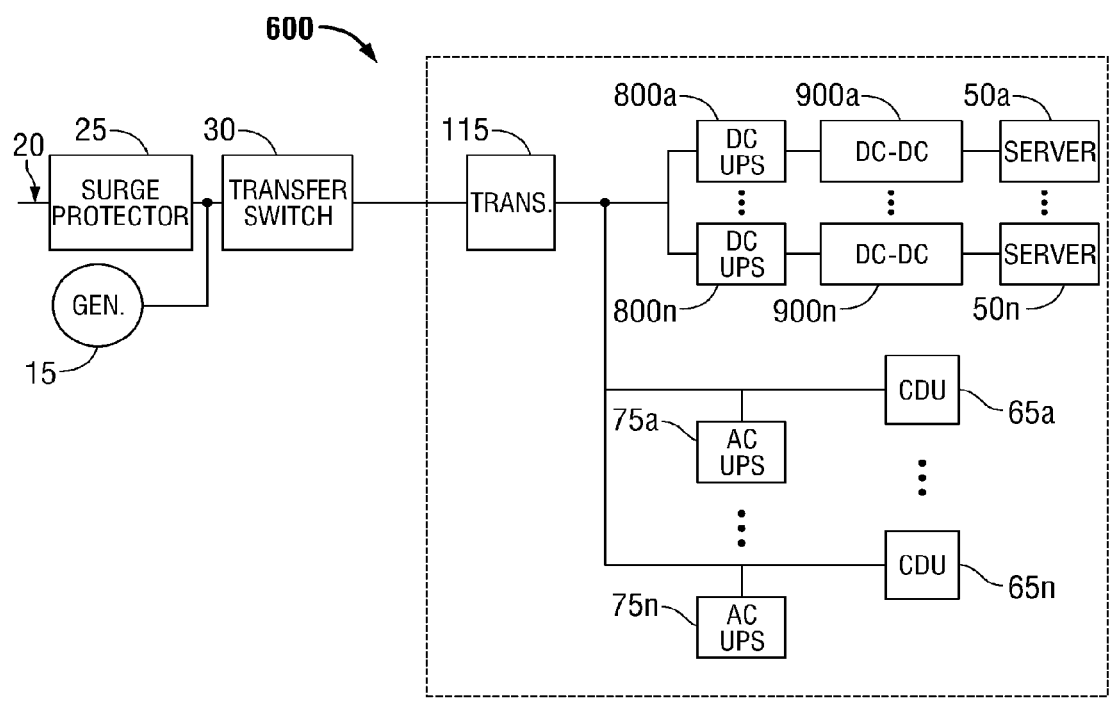
FIG. 9 shows a data center according to embodiments of the present disclosure having modular single-conversion DC UPSs and a modular single-conversion DC-DC server power supply wherein CDUs are connected to AC UPSs and the AC UPSs are connected in an efficient energy saver (ES) mode.
Figure 10A:
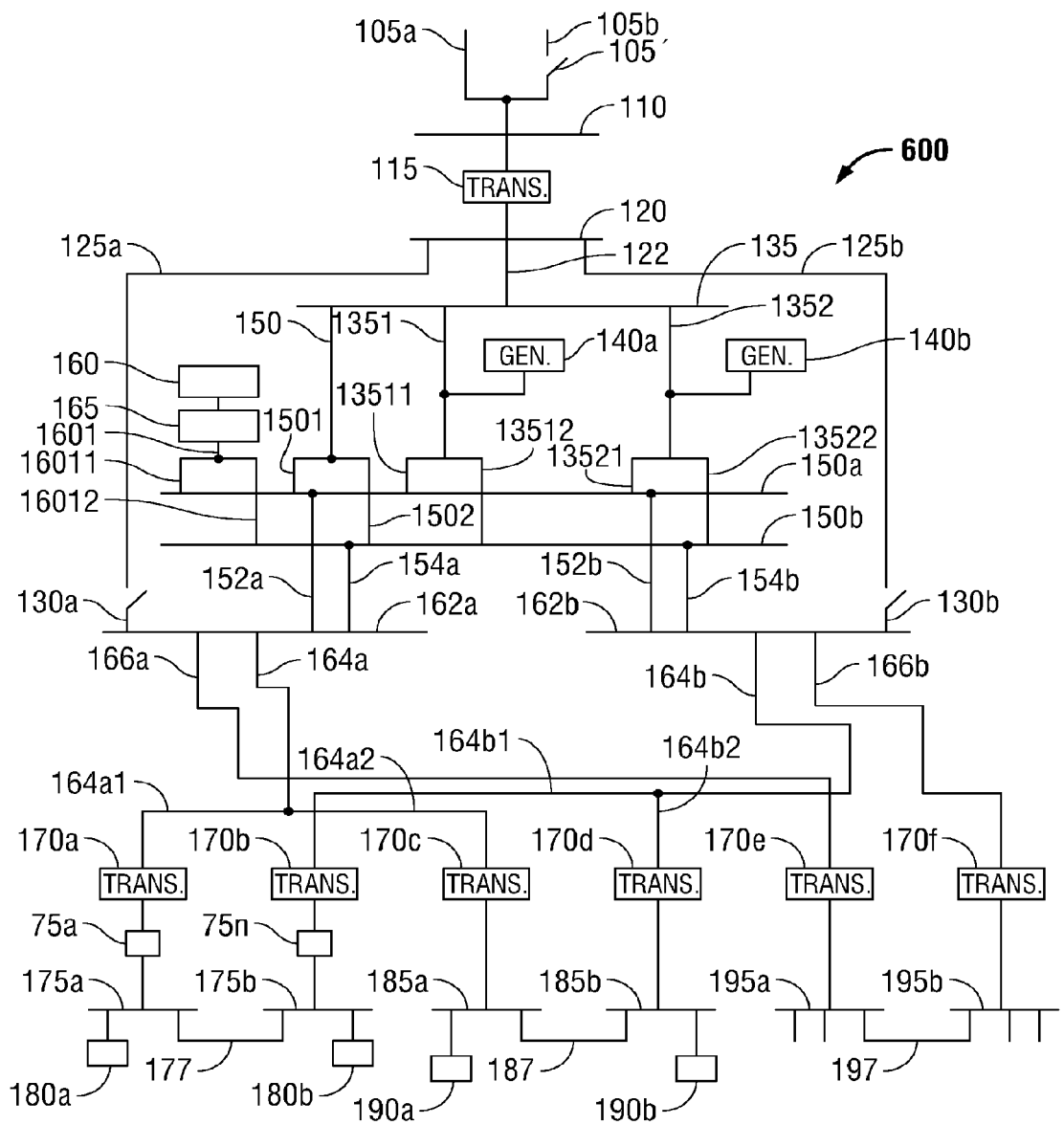
FIG. 10A is a schematic, one-line illustration of the bus power arrangement of a modular data center according to one embodiment of the present disclosure having DC UPSs and a server power supply with DC input voltage as shown in FIG. 9 in which, during normal operation, IT and mechanical loads of the data center are able to be powered entirely by the utility power feeders through a DC UPS.
Figure 10B:
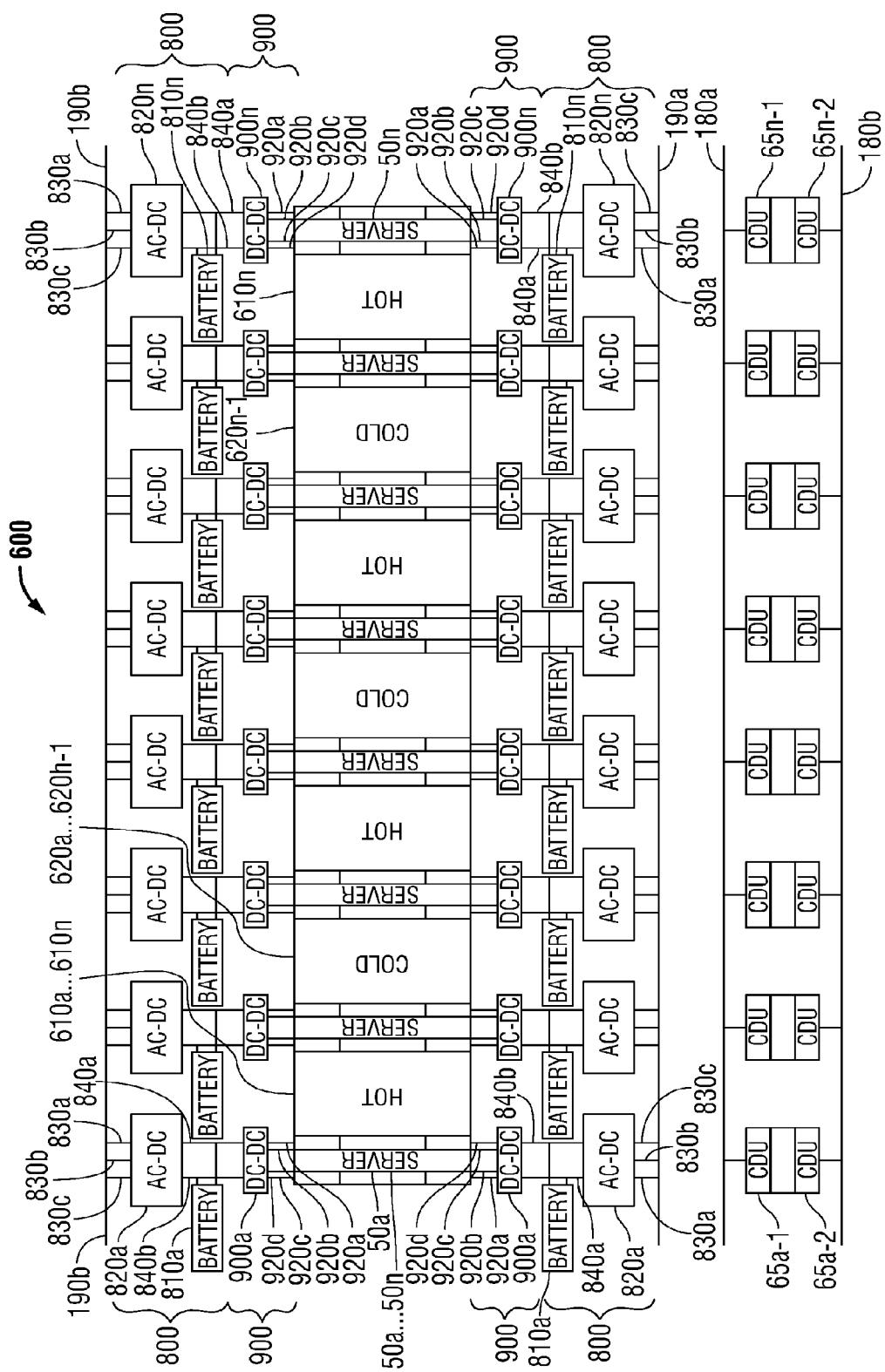
FIG. 10B is a schematic illustration of the connections between buses dedicated to mechanical/CDU loads and connections between buses dedicated to IT loads for the modular data center of FIG. 10B according to one embodiment of the present disclosure as shown in FIG. 9.

More particularly, FIG. 9 shows a data center 600 having modular DC UPSs 800a . . . 800n. Data center 600 uses modular, off-line AC UPSs 75a . . . 75n in energy saver (ES)

mode to supply power to mechanical CDU loads 65a-1 . . . 65n-1, which are supplied power from bus 180a, and CDU loads 65a-2 . . . 65n-2, which are supplied power from bus 180b (see FIGS. 10A and 10B). DC UPSs 800a . . . 800n supply power to respective IT loads 50a . . . 50n via respective DC-DC converters 900a . . . 900n that electrically couple the respective DC UPSs 800a . . . 800n and the respective IT loads (servers) 50a . . . 50n. The IT loads 50a . . . 50n are disposed between alternating hot aisles 610a . . . 610n and cold aisles 620a . . . 620n-1.

FIGS. 10A and 10B show schematic diagrams of data center 600 according to one embodiment of the present disclosure. As compared to conventional data center 100 described above with respect to FIGS. 2 and 3, in which buses 190a, 190b connect each server 50a . . . 50n via AC-DC converters 520a . . . 520n and DC-DC converters 510a . . . 510n, buses 190a, 190b now connect to each server 50a . . . 50n via respective AC-DC converters 820a . . . 820n from AC inputs 830a, 830b, 830c and respective DC-DC converters 900a . . . 900n connecting to each server 50a . . . 50n via outputs 840a . . . 840b from AC-DC converters 820a . . . 820n.

Figure 11:
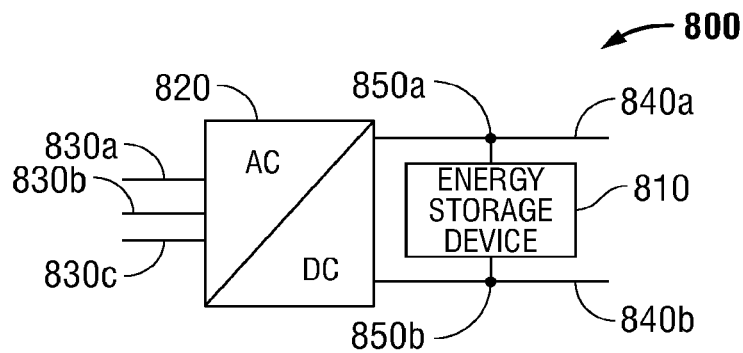
FIG. 11 illustrates a DC UPS which includes a battery and an AC-DC converter which includes AC inputs from each of the cableways of FIG. 10B according to one embodiment of the present disclosure wherein the outputs from AC-DC converter are supplied to the battery and the DC-DC converter of the server power supply.

FIG. 11 shows DC UPS 800 which includes energy storage device 810. The energy storage device 810 may be a low-voltage, lithium-ion battery or an ultracapacitor or a combination of a low-voltage, lithium-ion battery and an ultracapacitor. For example, the energy storage device 810 may provide 12 V, 24 V, or 48 V. The DC UPS 800 includes an AC-DC converter 820, which includes AC inputs 830a . . . 830c from each of the buses 190a, 190b. The outputs 840a, 840b from AC-DC converter 820 are supplied to energy storage device 810 at positive junction 850a on output 840a and at negative junction 850b on output 840b and to DC-DC converter 900 of the server power supply.

Figure 12:
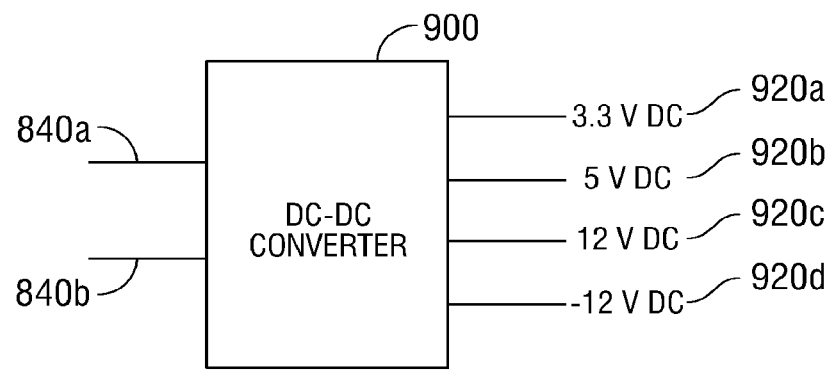
FIG. 12 illustrates a DC-DC converter which includes two DC inputs from respective bus feeds and which includes multiple outputs for supplying a plurality of different DC voltages to the servers illustrated in FIG. 10B according to one embodiment of the present disclosure.

FIG. 12 shows DC-DC converter 900, which receives as inputs the DC outputs 840a, 840b from AC-DC converter 820 and which provides multiple outputs 920a . . . 920d for supplying a plurality of different DC voltages to servers 50a . . . 50n (see FIG. 10B).

Figure 13:
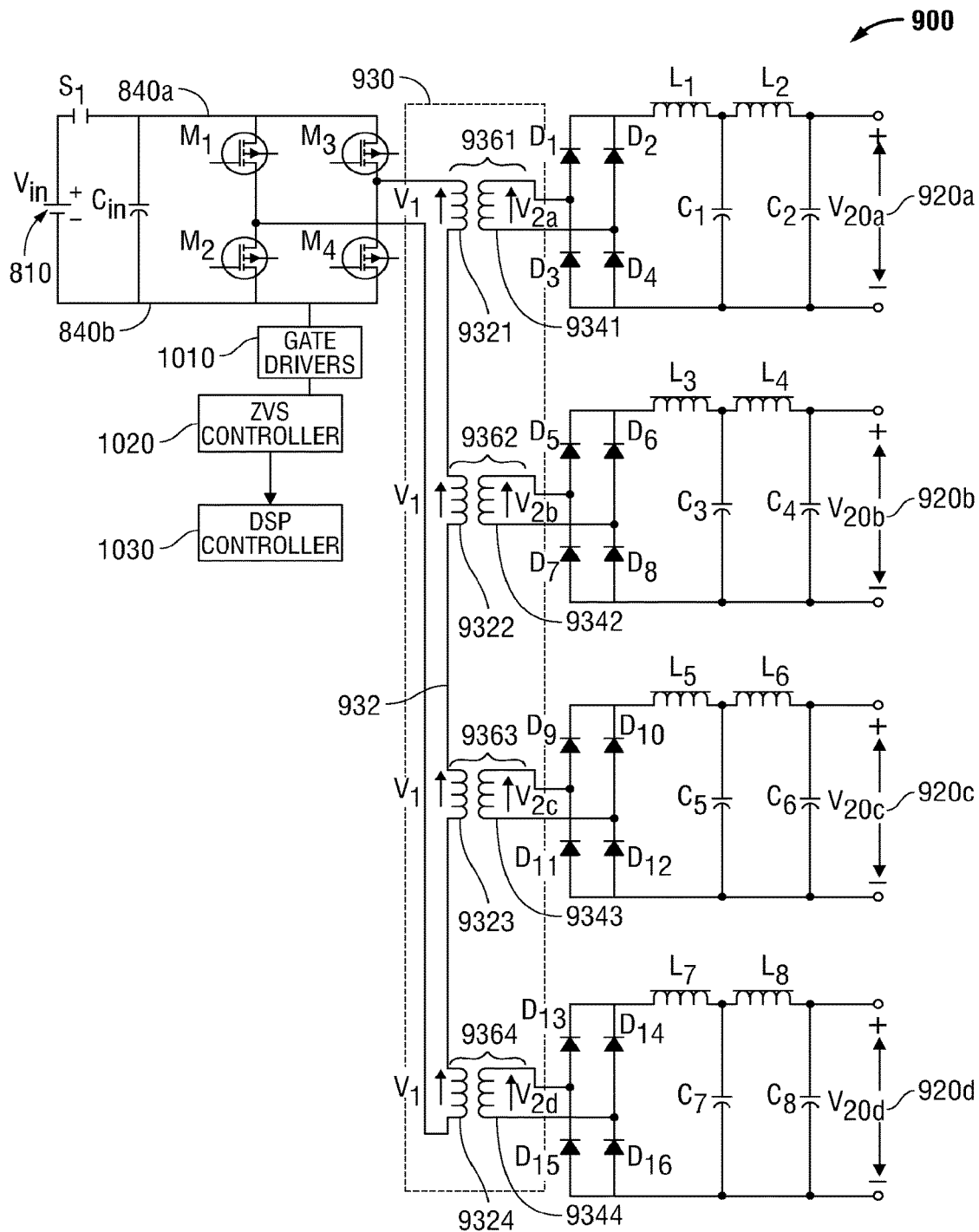
FIG. 13 is a schematic diagram of a DC-DC converter according to one embodiment of the present disclosure in which a DC voltage is supplied from either a battery or the output of the AC-DC converter illustrated in FIG. 12 to a DC-DC converter in which a zero-voltage switching (ZVS) control strategy is applied.

FIG. 13 is a schematic diagram of an exemplary DC-DC converter 900 according to one embodiment of the present disclosure. A DC voltage is supplied from either energy storage device 810 or AC-DC converter 820 (see FIG. 11) to the DC-DC converter 900 via DC outputs 840a, 840b (see FIG. 12). Capacitor Cin is connected in parallel with the energy storage device 810 and with four MOSFETs M1 . . . M4 electrically coupled together in an H-bridge configuration, all in parallel with the DC outputs 840a and 840b. Safety switch S1 is electrically coupled in series between the H-bridge energy storage device Min, 810 on the positive terminal side of energy storage device 810 and DC output 840a to isolate the server side represented by the MOSFETs M1 to M4 and the supply side of the bridge energy storage device Min, 810. MOSFETs M1 . . . M4 enable high-frequency switching of the server power supply 900 in the range of about 80 kHz to about 120 kHz.

The MOSFETs M1 . . . M4 are controlled by digital signal processing (DSP) controller 1030 via gate drivers 1010. Based on input to DSP controller 1030, ZVS controller 1020 implements a zero-voltage switching (ZVS) strategy on MOSFETs M1 . . . M4 via gate drivers 1010. A DSP-based ZVS strategy may be employed to operate the server power supply 900. The high-frequency DC-DC converter 900 thus includes the plurality of MOSFETs M1 . . . M4 and zero-voltage switching controller 1020 electrically coupled to the plurality of MOSFETs M1 . . . M4 to output a plurality of DC voltages V20a, V20b, V20c, and V20d at respective DC outputs 920a, 920b, 920c, and 920d from the high-frequency DC-DC converter 900.

An example of a ZVS control strategy is disclosed in "Evaluation of a Novel Analog Bi-directional ZVS Controller for High Frequency Isolated DC-DC Converters," by Subrata K. Mondal, published in the 34th Annual Conference of the IEEE Industrial Electronics Society, Nov. 10-13, 2008, E-ISBN 978-1-4244-1766-7, ©2008 IEEE, which is hereby incorporated by reference.

When operated, the four MOSFETs M1 . . . M4 output a first voltage V1 at multiple input coils 9321, 9322, 9323, 9324 of single primary coil 932 of multiple secondary winding planar transformer 930. First input coil 9321 induces a voltage V2a in first secondary coil 9341. Thus, a first sub-transformer 9361 is formed by first input coil 9321 and first secondary coil 9341. Similarly, second input coil 9322 induces a voltage V2b in second secondary coil 9342 such that a second sub-transformer 9362 is formed by second input coil 9322 and second secondary coil 9342.

Additionally, third input coil 9323 induces a voltage V2c in third secondary coil 9343 such that a third sub-transformer 9363 is formed by third input coil 9323 and third secondary coil 9343. Fourth input coil 9324 induces a voltage V2d in fourth secondary coil 9344 such that a fourth sub-transformer 9364 is formed by fourth input coil 9324 and fourth secondary coil 9344.

Voltage V2a is then supplied through diodes D1 . . . D4 and two LC filters, which include inductors L1, L2 and capacitors C1, C2, which results in output DC voltage V20a, 920a. Voltage V2b is then supplied through diodes D5 . . . D8 and two LC filters, which include inductors L3, L4 and capacitors C3, C4, which results in output DC voltage V20b, 920b. Voltage V2c is then supplied through diodes D9 . . . D12 and two LC filters, which include inductors L5, L6 and capacitors C5, C6, which result in output DC voltage V20c, 920c. Voltage V2d is then supplied through diodes D13 . . . D16 and two LC filters, which include inductors L7, L8 and capacitors C7, C8, which results in output DC voltage V20d, 920d.

If output from AC-DC converter 820 is not available due to the unavailability of an AC input, then voltage Vin, from energy storage device 810 is switched on via safety switch S1 to the planar transformer 930. Normally, the DC output of AC-DC converter 820 is slightly higher as it charges energy storage device 810 in normal operation and provides output at DC outputs 840a and 840b. Normally, since the output 840a and 840b of the AC-DC converter 820 and the output of the energy storage device 810 are in parallel so the voltage is the same at the common junction or terminal 850b (see FIG. 11).

Figure 1A:
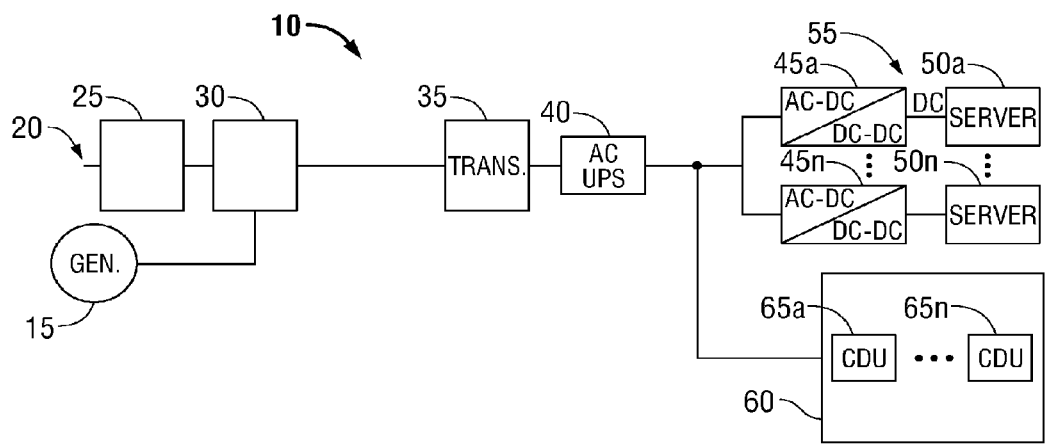
FIG. 1A shows a conventional modular data center with a centralized double conversion (AC-DC/DC-AC) alternating current AC UPS, and double conversion (AC-DC/DC-DC) server power supplies with an AC input and a DC output supplying IT and mechanical loads.
Figure 2:
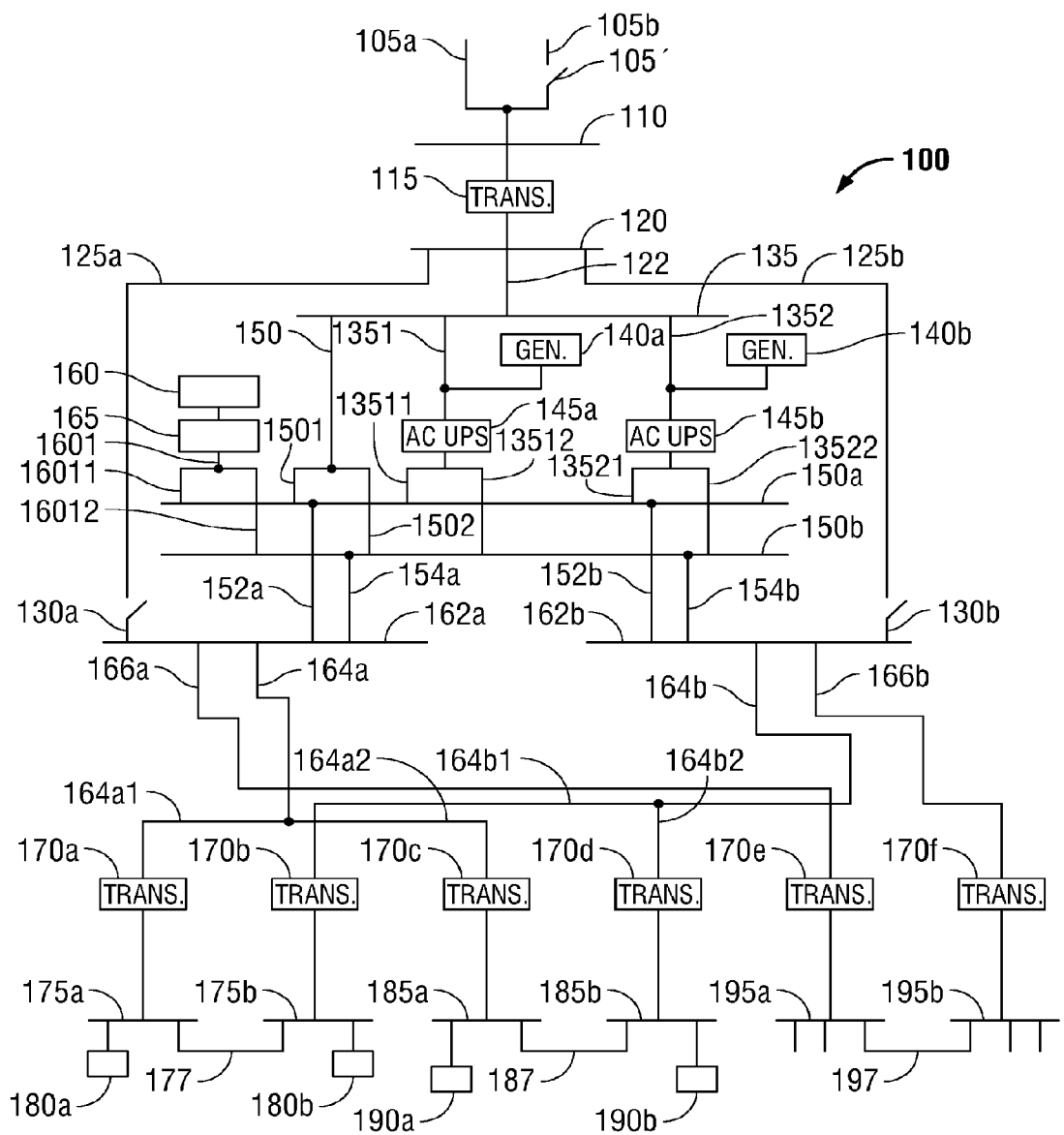
FIG. 2 is a schematic, one-line illustration of the bus power arrangement of a conventional modular data center having AC UPSs and a server power supply with an AC input voltage in which, during normal operation, IT and mechanical loads of the data center are powered entirely by the utility power feeders via on-line double conversion AC UPSs that are similar to the centralized AC UPS illustrated above with respect to FIG. 1A.
Figure 3:
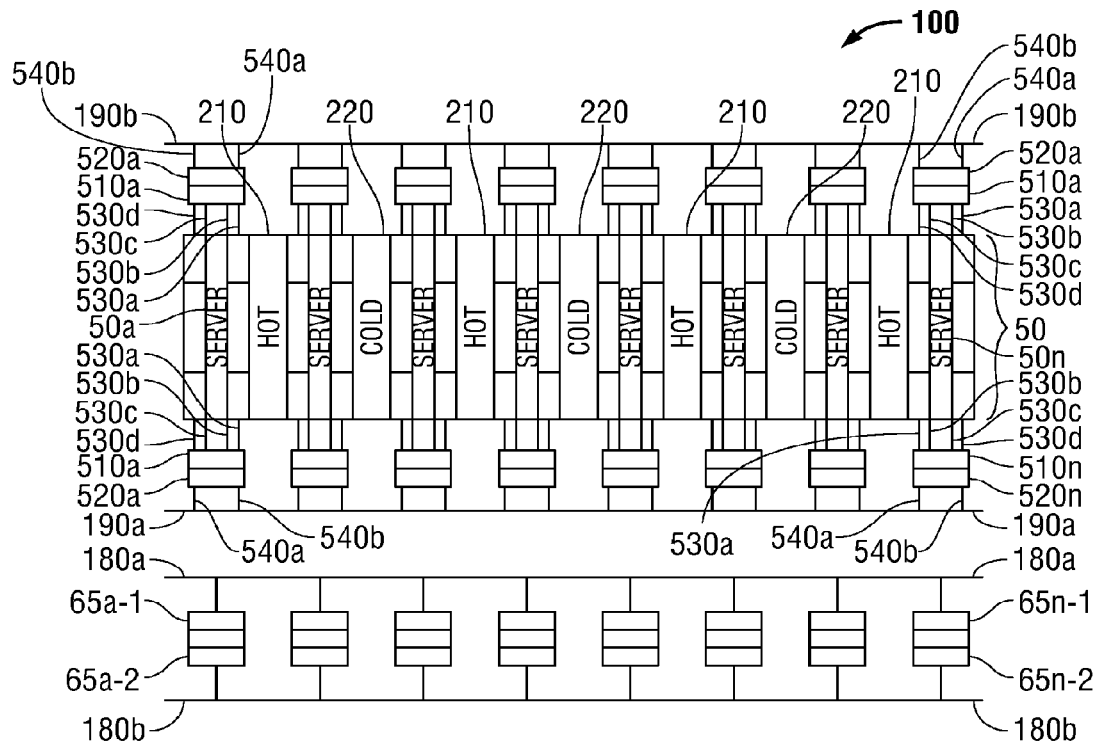
FIG. 3 is a schematic, one-line illustration of the connections between buses dedicated to mechanical/CDU loads and connections between buses dedicated to IT loads for the conventional modular data center of FIG. 2.

Some advantages of the data center 600 illustrated in FIGS. 10A and 10B over conventional data centers, such as data center 100 illustrated in FIGS. 2 and 3, is that data center 600 eliminates higher capacity, over-sized, centralized, double conversion AC-DC/DC-AC AC UPSs such as AC UPS 40 in FIG. 1A. Furthermore, there is no need for lead-acid high-voltage batteries and a separate battery room. Electrical losses are also reduced and efficiency is improved because of the use of single conversion AC-DC DC UPS 800. Also, the UPS cost is less and the load utilization factor is higher due to the use of a modular UPS design, and electrical losses are reduced and efficiency improved because of the use of single-stage DC-DC conversion of server power supply with DC input voltage. Furthermore, efficiency of the server power supply is improved due to use of the ZVS technique with super-compact, high switching frequency, and high efficiency planar transformer 930 of FIG. 13. The data center 600 also uses single stage conversion unlike a server power supply with an AC input. Also, a low-voltage energy storage device such as a battery or an ultra-capacitor or a combination of a battery and an ultra-capacitor is used for the DC UPS, and Lithium-ion batteries improve battery life and energy density is higher in comparison to lead-acid batteries.

Figure 5:
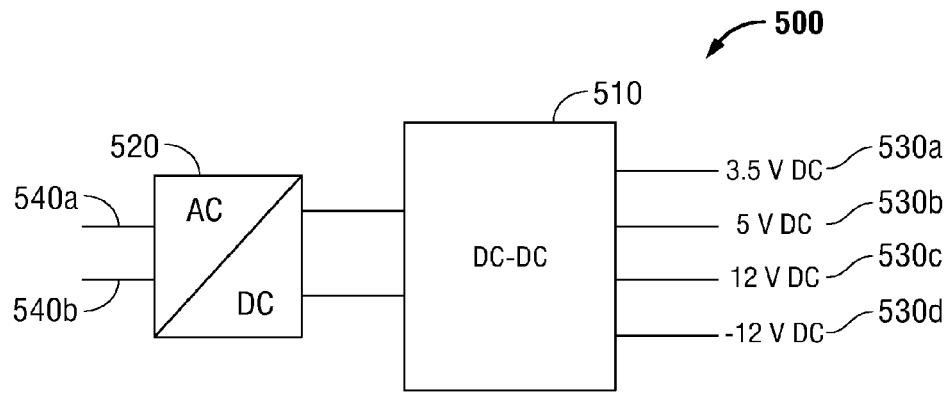
FIG. 5 is a schematic illustration of a prior art single-phase server power supply, which includes two AC inputs (1-phase AC) from respective IT buses, that converts an AC voltage of the AC inputs to an intermediate DC voltage and, in turn, into multiple low DC voltages using its DC-DC converters.

The design of data center 600 eliminates issues associated with a double conversion AC UPS 40 and the double conversion server power supply with the AC input voltage via single phase AC supply lines 540a, 540b of FIG. 5.

The use of modular DC UPSs 800 and DC-DC server power supplies 900 with DC input voltage, as illustrated in FIG. 10B, leads to higher efficiency, lower capital investment and lower operating energy costs. This topology can also be easily scaled based on the required load. The DC UPSs 800 are of modular design based on initial data center load to improve UPS utilization load factor which leads to higher efficiency and to reduced capital cost. The developed UPS system will occupy less floor space due to its modular design. The Data Center design can be used for Tier-2, Tier-3, and Tier-4 in an N+1 configuration.

Figure 1B:
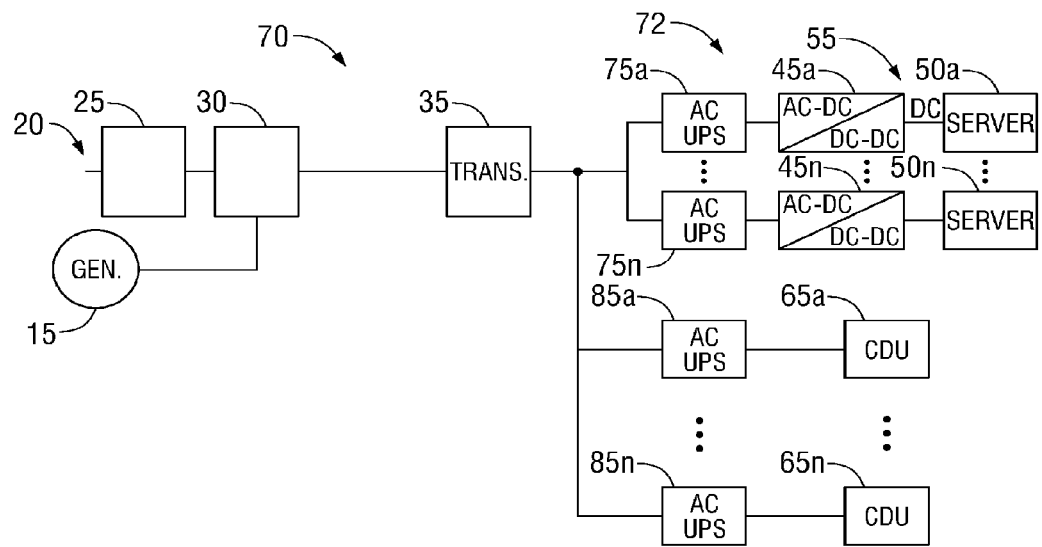
FIG. 1B shows a conventional modular data center system including modular, scalable, double-conversion UPS systems and server power supplies with AC input voltages.
Figure 4:
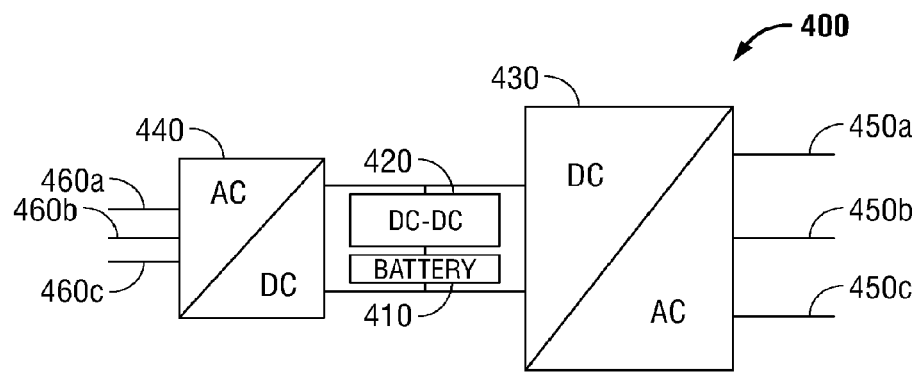
FIG. 4 is a schematic block diagram of a 3-phase double-conversion AC UPS that can be used as the AC UPSs of FIG. 2, which includes an AC-DC converter, a bi-directional DC-DC converter for a battery, a battery as an energy storage device, and a DC-AC 3-phase inverter.
Figure 14:
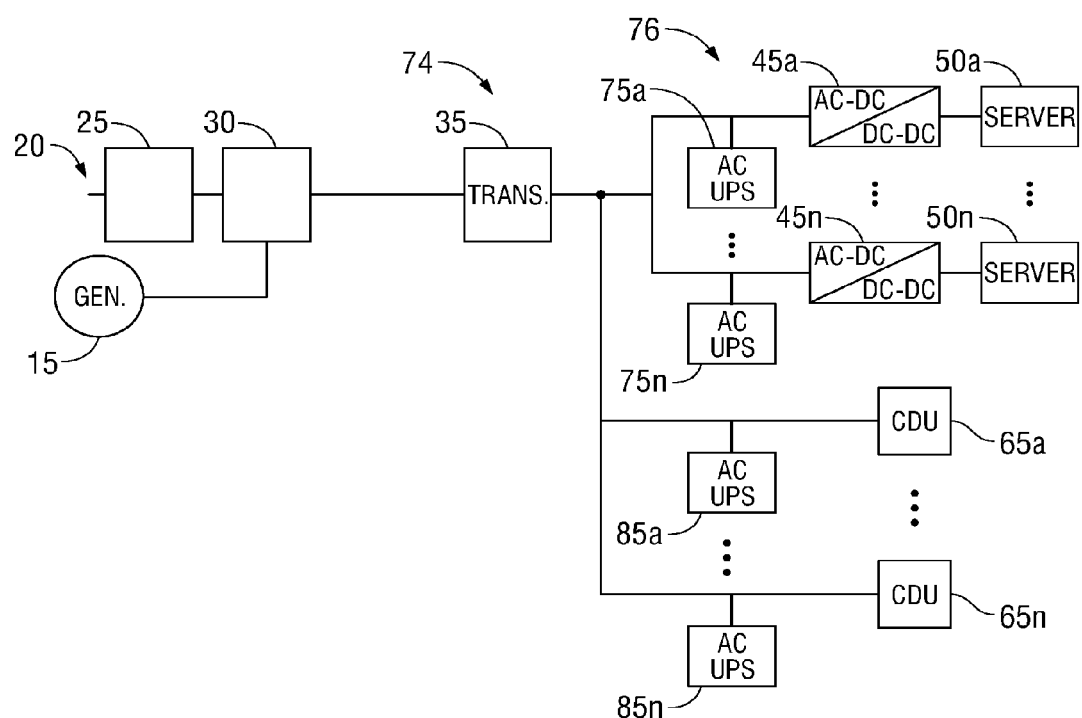
FIG. 14 shows a modular data center system including modular, scalable, UPS systems and server power supplies with AC input voltages similar to the data center system of FIG. 1B wherein AC UPSs are configured to operate in off-line energy saver (ES) mode.

Similar to the data center 600 of FIG. 9, FIG. 14 illustrates a modular data center system 74 including a modular, scalable, double-conversion UPS system 76 and server power supplies with AC input voltages similar to the data center system 70 of FIG. 1B and which includes off-line AC UPSs 75a . . . 75n and 85a . . . 85n configured to operate in energy saver (ES) mode, which enables the modular scalable UPS system to have a reduced PUE, instead of double-conversion mode as shown in FIG. 4 and server power supplies 45a . . . 45n with AC input voltages. In ES mode, utility power 20 is supplied directly to IT loads 50a . . . 50n and mechanical CDU loads 65a . . . 65n. Line filtering is performed by filter circuits (not shown) included with AC UPSs 75a . . . 75n. The effective efficiency of the AC UPSs 75a . . . 75n to the IT loads 50a . . . 50n and AC UPSs 85a . . . 85n to respective CDU loads 65a . . . 65n is about 99% in ES mode.

However, data center 74 of FIG. 14 differs from data center 600 of FIG. 9 in that DC UPSs 800a . . . 800n are AC UPSs 75a . . . 75n and DC-DC converters 900a . . . 900n are AC-DC/DC-DC server power supplies 45a . . . 45n.

In contrast, the efficiency of UPSs 145a, 145b (see FIG. 2) in double-conversion mode at nominal load is around 94%-96%. Therefore, overall efficiency improvement in using the AC UPSs 75a . . . 75n in ESS mode is about 3 to 5%. However, AC-DC and DC-DC converters in the server power supplies 45a . . . 45n are required to supply a DC voltage to respective server loads 50a . . . 50n. The lead-acid batteries in the AC UPSs 75a . . . 75n have to be stored in a room separate from the servers 50a . . . 50n.

Figure 15:
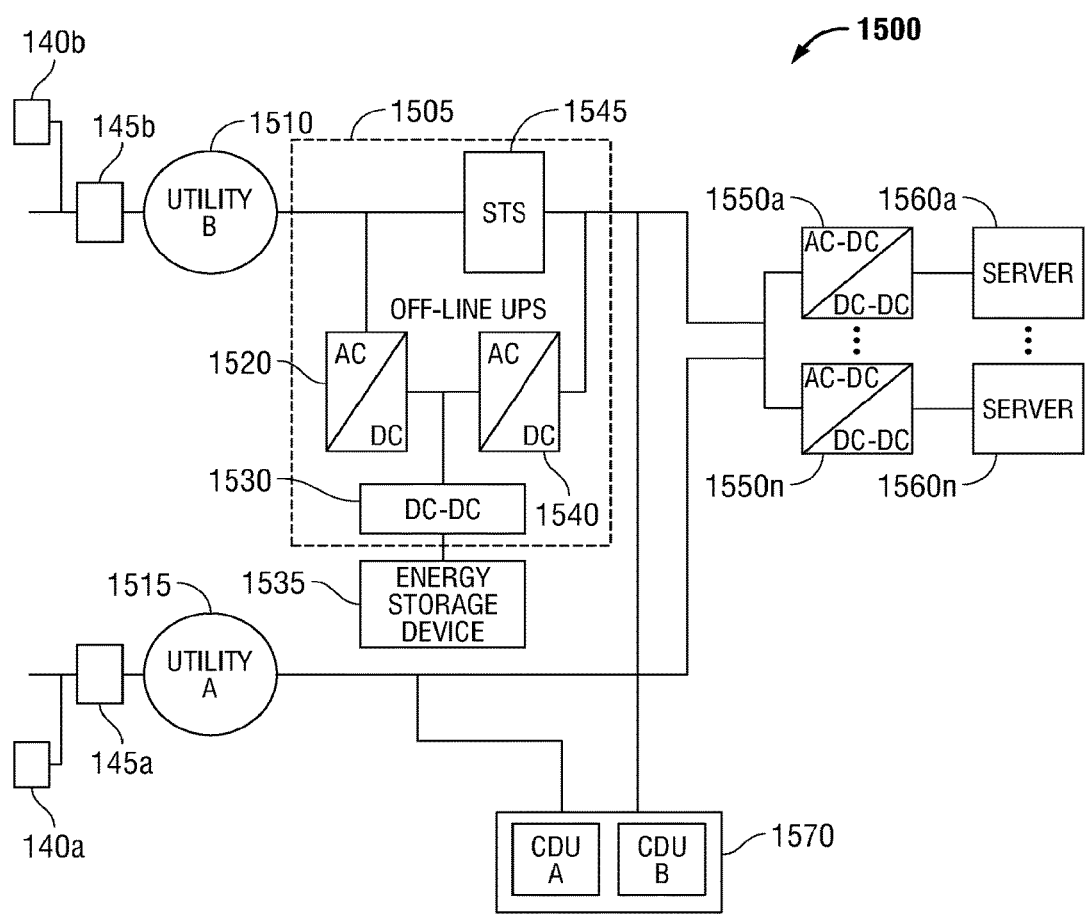
FIG. 15 illustrates a modular data pod schematic according to one embodiment of the present disclosure wherein an AC UPS is connected in off-line energy saver (ES) mode in which utility power from one utility feed bus is supplied directly to critical IT loads and mechanical loads during normal operation.

Referring to FIG. 15, efficiency improvements of the modular data pod 1500 are achieved by connecting an AC UPS 1505 in energy saver (ES) mode, i.e., in off-line UPS mode. In ES mode, utility power is supplied directly to critical IT loads 1560a . . . 1560n and mechanical load 1570 (e.g., a cooling mechanism) during normal operation. Line filtering is performed by using filter circuits (not shown) of the AC UPS 1505. For the modular data pod 1500 illustrated schematically in the block diagram of FIG. 15, the effective UPS efficiency is around 99%. UPS efficiency in double-conversion mode is around 94%-96% at nominal load. Therefore, overall efficiency improvement in ES mode is around 3 to 5%. In FIG. 15, the same UPS 1505 supplies power to both mechanical loads 1570 and IT loads 1560a . . . 1560n.

The AC UPS 1505 includes an AC-DC converter 1520, a DC-DC converter 1530, a DC-AC inverter 1540, an energy storage device 1535, and a Static Transfer Switch (STS) 1545. The STS 1545 is in parallel with the AC-DC converter 1520 and the DC-AC inverter 1540 of AC UPS 1505.

The IT cooling capacity of the CDU 1570 is around 350 kW. Therefore, the UPS rating should be around that range for optimum operation. Either utility power feeder line 1510 or 1515 (Utility A and B, respectively) has sufficient capacity to handle the entire load alone in case of failure of the other. However, each feeder line A and B 1510, 1515 generally works in combination, each carrying 50% of the entire load. Feeder line B (1510) has a UPS in ES mode with 3 to 5 minutes of back-up storage capacity. Additionally, the feeder line B (1510) is connected directly to the CDU load 1570. Moreover, server power is supplied to the IT loads 1560a . . . 1560n via dual conversion AC-DC/DC-DC server power supplies 1550a . . . 1550n, where the server power may be in the range of 350 kW of IT load capacity. The UPS may be performed on one feeder (e.g., feeder 1510) or both feeders (1510, 1515) depending on modular data pod design requirements.

Figure 16:
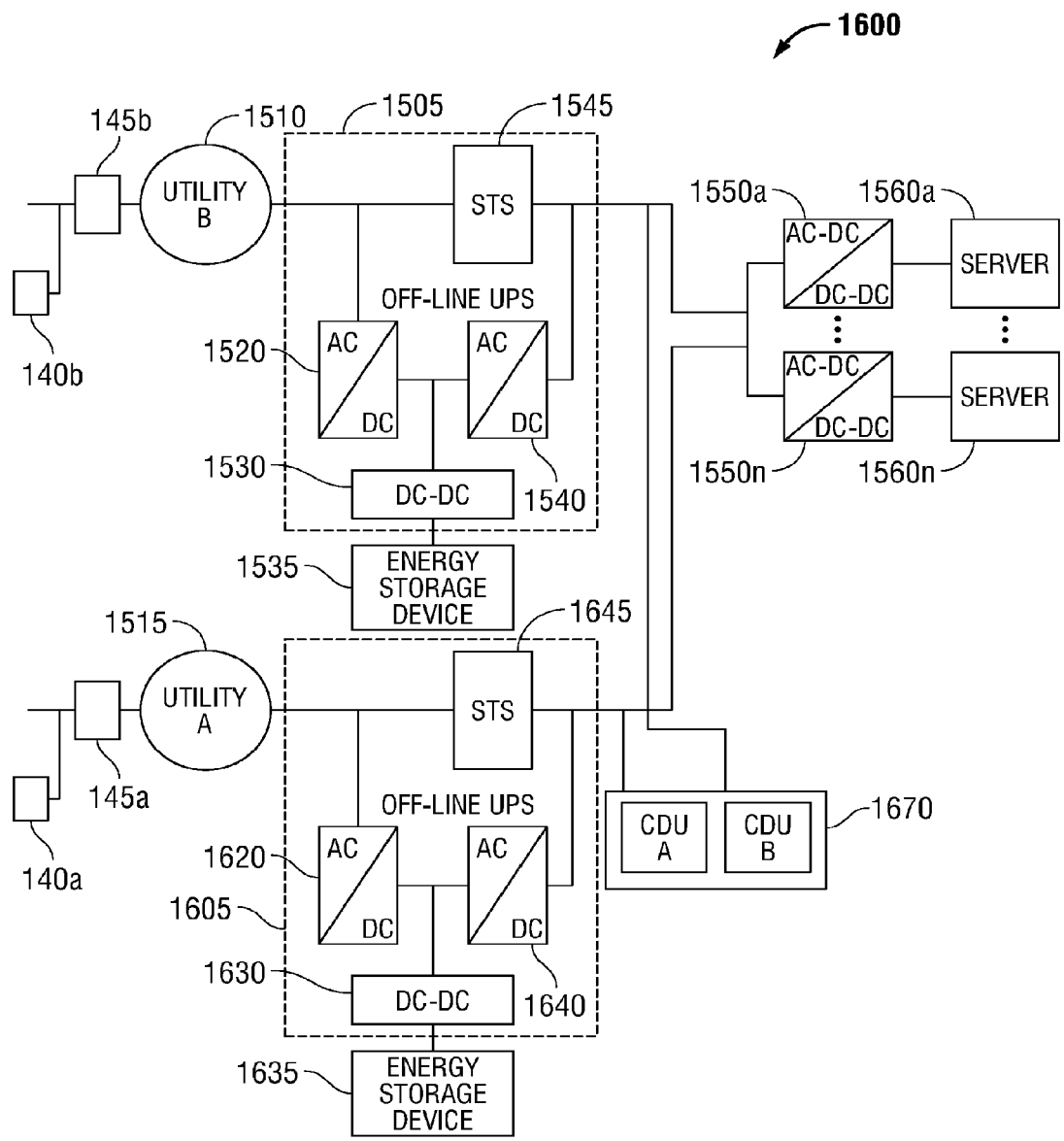
FIG. 16 illustrates the modular data center according to one embodiment of the present disclosure, where each utility power feeder line has separate and distinct UPSs connected in off-line energy saver (ES) mode.

FIG. 16 illustrates modular data center 1600, where each utility power feeder line A and B (1510, 1515) has separate and distinct UPSs 1505, 1605 in ES mode. The UPS 1505 includes an AC-DC converter 1520, a DC-DC converter 1530, a DC-AC inverter 1540, an energy storage device 1535, and a Static Transfer Switch (STS) 1545. The UPS 1605 includes an AC-DC converter 1620, a DC-DC converter 1630, a DC-AC inverter 1640, an energy storage device 1635, and a Static Transfer Switch (STS) 1645. Both feeder lines A and B (1510, 1515) are connected directly to cooling load 1670. Moreover, server power is supplied to the IT loads 1560a . . . 1560n via the server power supplies 1550a . . . 1550n, where the server power may be in the range of about 350 kW of IT load capacity.

Figure 17A:
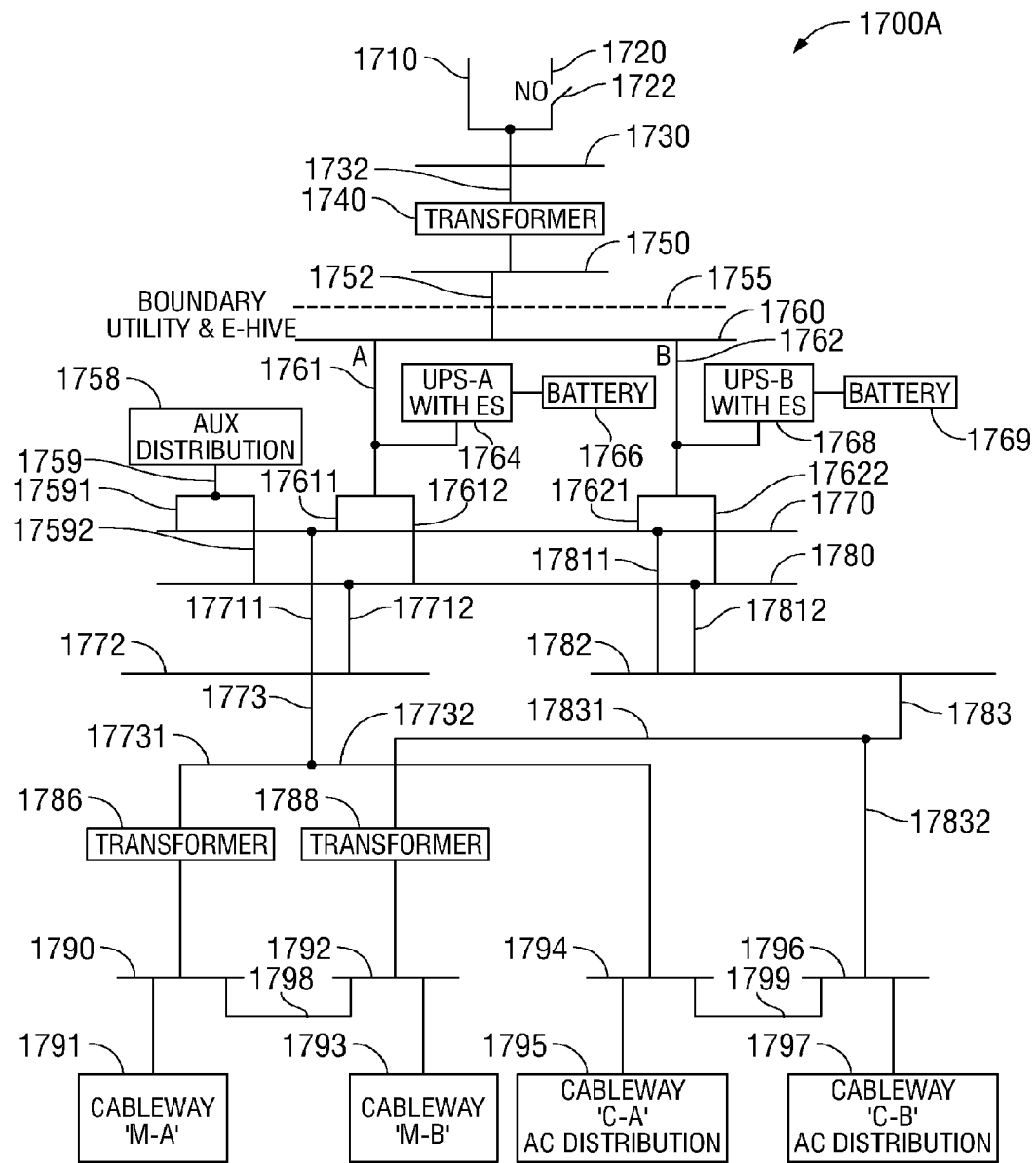
FIG. 17A is a schematic illustration of one embodiment of the present disclosure of the bus power arrangement of a modular data pod having off-line double conversion AC UPSs in energy saver mode and a server power supply with an AC-DC converter and a DC-DC converter in which, during normal operation, IT and mechanical loads of the data center are powered entirely by the utility power feeders as illustrated in FIG. 16.
Figure 17B:
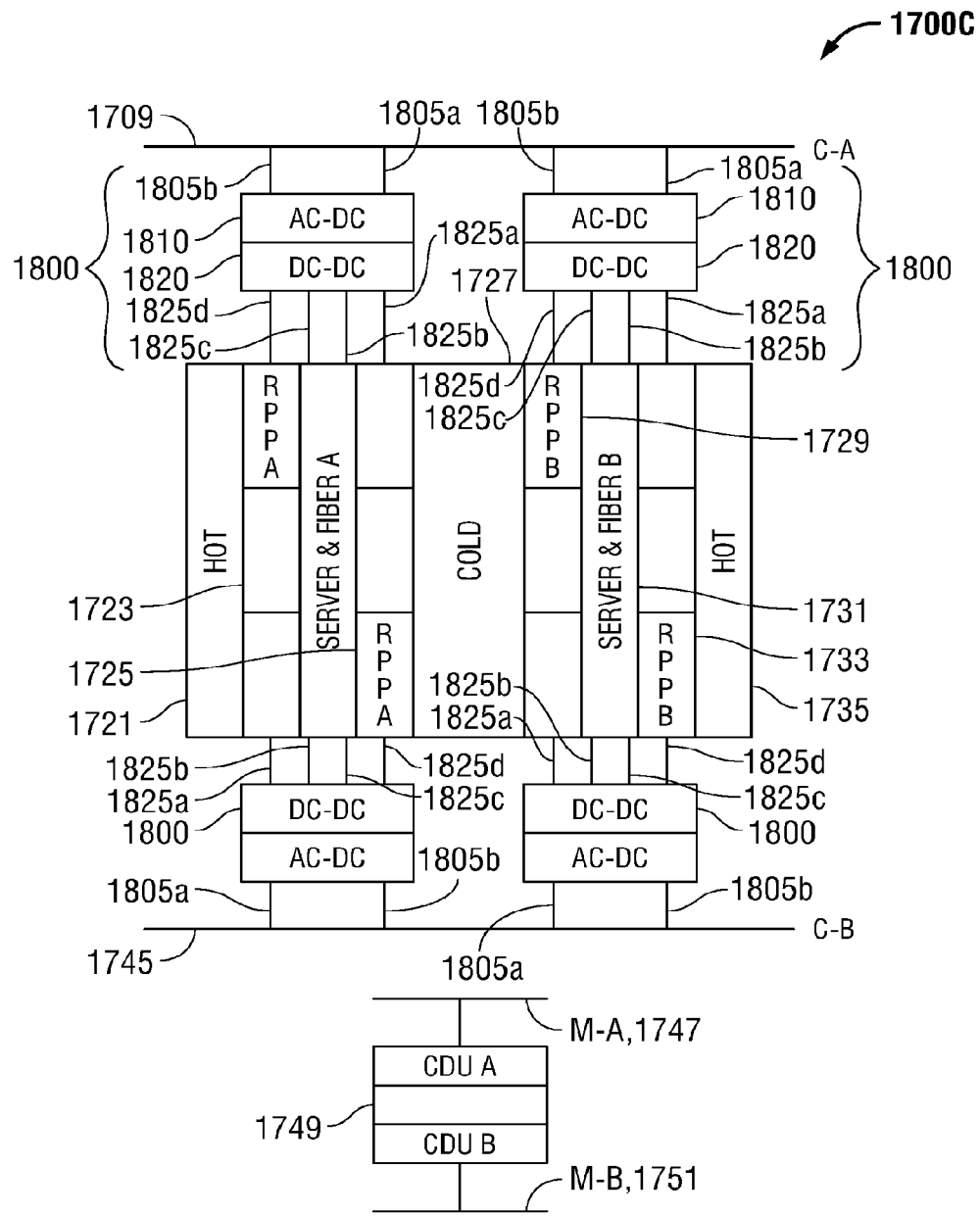
FIG. 17B is a continuation of the schematic illustrations of one embodiment (FIG. 17A) of the present disclosure of the bus power arrangement of a modular data pod having off-line double conversion AC UPSs in an energy saver mode of FIG. 17A and illustrating the bus power arrangement supplying power at an individual modular data pod.

FIGS. 17A and 17B illustrate a one-line diagram of data center pods 1700A, 1700B, having AC UPSs (A and B; 1764, 1768; see FIG. 17A) on both branch lines A, B and server power supply with AC input voltage. During normal operation, the IT loads and the mechanical loads of data center 1700 are powered entirely either by the utility power feeders 1 or 2 (1710, 1720) as AC UPSs A, B (1764, 1768) are in Energy Saver (ES) mode. ES mode enables reduced PUE as the effective efficiency of an AC UPS in ES mode is about 99%. The utility power source is usually connected to the data center 1700 through the first utility power feeder 1 (1710). The second utility power feeder 2 (1720) is normally open (NO) via switch 1722 and supplies the data center load (both IT and mechanical loads) in case the first utility power feeder 1 (1710) malfunctions.

A transformer 1740 steps down the voltage from the utility power feeders 1 and 2 (1710, 1720) through bus tie 1732 to main switchgear 1750. A utility switchgear 1730 is positioned between the feeder lines 1710, 1720 and the transformer 1740. Additionally, a main switchgear 1750 and a critical input switchgear 1760 are electrically coupled through tie 1752 and are positioned between the transformer 1740 and the AC UPSs A, B (1764, 1768). AC UPS A (1764) includes an energy storage device 1766 electrically coupled to tie 1761 between switchgear 1760 and split feeder 17611 to bus 1770 and split feeder 17612 to bus 1780, whereas AC UPS B (1768) includes an energy storage device 1769 electrically coupled to tie 1762 between switchgear 1760 and split feeder 17621 to bus 1770 and split feeder 17622 to bus 1780.

Bus 1770 is electrically coupled to critical distribution switchgear 1772 via tie 17711 and to switchgear 1782 via tie 17811. Bus 1780 is electrically coupled to critical distribution switchgear 1772 via tie 17712 and to switchgear 1782 via tie 17812.

Critical distribution switchgear 1772 is electrically coupled to mechanical load transformer 1786 via tie 1773 and split tie 17731 and to cableway "C-A" AC Distribution 1795 via bus 1794 via tie 1773 and split tie 17731.

Similarly, critical distribution switchgear 1782 is electrically coupled to mechanical load transformer 1788 via tie 1783 and split tie 17831 and to cableway "C-B" AC Distribution 1797 via bus 1796 and tie 1783 and split tie 17832.

In operation or use, when a disturbance in the utility power occurs, the UPSs A, B (1764, 1768) immediately take over the loads. When the disturbance in the utility power feeder 1 (1710) is no longer present, the loads are shifted from the UPS batteries (1766, 1769) to the utility power feeder 1 (1720). The UPS batteries 1766, 1769 are recharged by the utility power feeder via step-down transformer 1740. An auxiliary distribution source 1758 supplies power to the loads upon failure of the UPSs A and B (1764, 1768). The power is supplied from auxiliary distribution source 1758 via ties 1759 to and split tie 17591 to output switchgear 1770 and via split tie 17592 to output switchgear 1780.

Mechanical load transformers (1786, 1788) supply power to the mechanical (CDU) load via switch gears 1790, 1792. Either transformer 1786, 1788 has sufficient capacity to handle the entire mechanical load alone in case of failure of the other. If either transformer 1786, 1788 fails, then power is supplied to cableways M-A or M-B (1791, 1793) via cross-tie 1798 between switchgear 1790 and 1792. Mechanical load transformers 1786, 1788 are connected to the UPSs A and B (1764, 1768) via first critical distribution switchgear 1772 and second critical distribution switchgear 1782, as well as output switchgears 1770 and 1780, as shown in FIG. 17A.

Either cableway 1795, 1797 (C-A or C-B) has sufficient capacity to handle the entire IT load alone in case of failure of the other. However, cableways 1791, 1793, 1795, 1797 generally work in combination, each carrying 50% of the load. However, cableways C-A and C-B (1795, 1797) usually supply power to IT loads, whereas mechanical cableways M-A and M-B (1791, 1793) usually supply power to mechanical/CDU loads 1749. Bus 1794 to cableway C-A (1795) can be cross-tied to bus 1796 and cableway C-B (1797) via cross-tie 1799.

The cooling mechanism is in thermal communication with each of the plurality of servers or IT loads 1723, 1725, 1729, 1731, 1733, and circulates a coolant that removes heat generated by the plurality of servers or IT loads 1723, 1725, 1729, 1731, 1733. The coolant may be pumped by a very efficient cooling distribution unit (CDU) with a heat exchanger (not shown) that allows the data center 1700C to use refrigerant cooling. Each CDU may support approximately 350 kW of IT load capacity.

FIG. 17B illustrates connections between buses M-A, M-B (1747, 1751) and mechanical/CDU loads 1749, and between buses C-A, C-B (1709, 1745) and IT loads. IT loads include a plurality of server rack assemblies (1723, 1725, 1729, 1731, 1733), which are separated from each other via cold aisles 1727. Additionally, the plurality of server rack assemblies (1723, 1725, 1729, 1731, 1733) are enclosed within hot aisles 1721, 1735. Each server rack assembly (1723, 1725, 1729, 1731, 1733) is electrically coupled to cableways C-A, C-B (1709, 1745) via server power supplies 1800 (see FIGS. 17B and 18).

Figure 18:
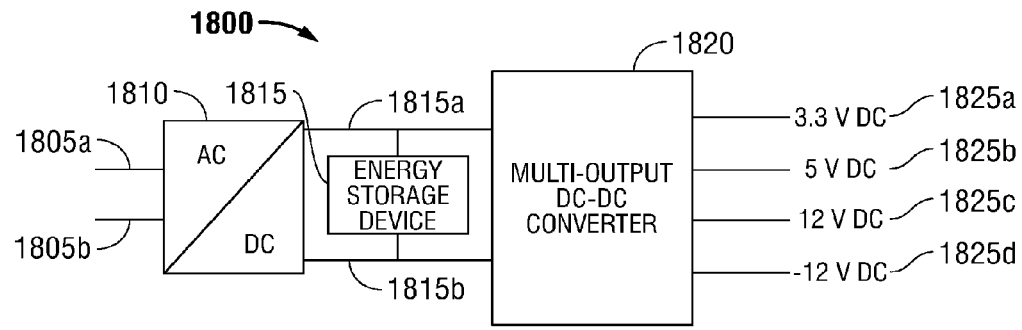
FIG. 18 illustrates a server power supply according to one embodiment of the present disclosure that is a combination of the AC-DC converter of FIG. 11 and the multi-output DC-DC converter of FIG. 13.

Referring to FIG. 18, each server power supply 1800 includes an AC-DC converter 1810 and multi-output DC-DC converter 1820, as described below. Server power supply 1800 as illustrated in FIG. 17B, includes two single phase AC inputs 1805a, 1805b from respective feed buses 1709 or 1745. The AC-DC converter 1810 converts a single-phase (e.g., 277 V) AC voltage to an intermediate DC voltage. DC-DC converter 1820 converts the intermediate DC voltage into multiple low DC voltages 1825a ... 1825d. For example, DC-DC converter 1820 can supply approximately 3.3 VDC, 5 VDC, 12 VDC and −12 VDC to the server as shown.

Figure 19:
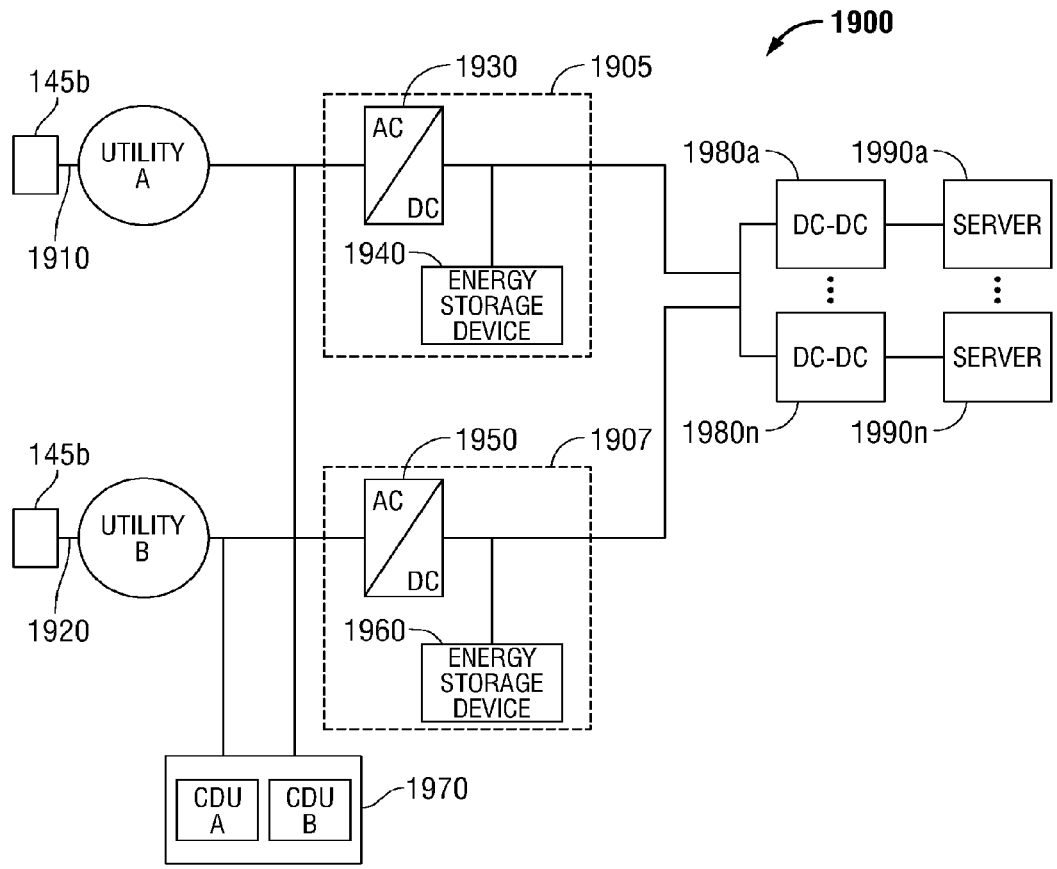
FIG. 19 illustrates a modular data pod according to one embodiment of the present disclosure, where each utility power feeder line has separate and distinct on-line single conversion DC UPSs connected to single conversion DC-DC converters (server supplies) at the input to the IT server loads.

FIG. 19 illustrates a second topology using Hybrid (both AC and DC) distribution wherein a direct current (DC) uninterruptible Power Supply (UPS) in conjunction with a server power supply with a DC input is employed, as described below with reference to FIGS. 19-24.

As compared to the server power supply 1800 of FIG. 18, modular data pod 1900 illustrated in FIG. 19 includes an on-line single conversion AC-DC converter 1930 and an energy storage device 1940 connected in ES mode 1905 for utility feed line 1910 for Utility A and an on-line single conversion AC-DC converter 1950 and an energy storage device 1960 connected in ES mode 1907 utility feed line 1920 for Utility B.

The on-line single conversion AC-DC converter 1930 and energy storage device 1940 connected in ES mode 1905 correspond to single conversion DC UPS 1810 and energy storage device 1815 of FIG. 18. Similarly, on-line single conversion AC-DC converter 1950 and energy storage device 1960 connected in ES mode 1907 also correspond to single conversion DC UPS 1810 and energy storage device 1815 of FIG. 18.

On-line single conversion DC-DC converters 1980a ... 1980n that are supplied by on-line single conversion AC-DC converter 1930 and energy storage device 1940 and on-line single conversion AC-DC converter 1950 and energy storage device 1960 and which supply power to IT loads 1990a ... 1990n correspond to multi-output DC-DC converter 1820 and DC outputs 1825a, 1825b, 1825c and 1825d in FIG. 18.

More particularly this further efficiency improvement is achieved by connecting on-line DC UPS 1905, 1907 on both supply lines 1910 and 1920 along with a server power supply with a DC input 1980a ... 1980n, as illustrated in FIG. 19. The first DC UPS 1905 includes AC-DC converter 1930 and energy storage device 1940. The second DC UPS 1907 includes AC-DC converter 1950 and energy storage device 1960. The modular data center 1900 is powered by a first utility feed 1910 and a second utility feed 1920. The server power is supplied from server power supplies 1980a ... 1980n via the DC UPSs 1905, 1907. The DC output of the server power is supplied to the IT loads 1990a ... 1990n. The cooling mechanism 1970 (or mechanical load) is supplied by both utility feeds 1910, 1920.

The DC UPS system 1900 is compact in comparison to existing AC UPS systems because there is no inverter (DC-AC) section, which leads to lower UPS losses. The efficiency of the DC server power supplies 1980a ... 1980n is also higher as there is no front-end AC-DC converter section, which leads to lower losses in comparison to conventional server power supplies with AC inputs.

The server power supplies 1980a ... 1980n, with a DC input voltage, according to one embodiment of the present disclosure, use the high-frequency zero-voltage switching (ZVS) technique with compact high-efficiency planar transformer 930, as described above with respect to FIG. 13, to improve power supply efficiency and to make the server power supplies 1980*a* . . . 1980*n* compact. Also, low-voltage (LV) Lithium-ion batteries can be used for the DC UPSs 1905, 1907. The LV lithium-ion batteries may supply 24 V or 48 V. Thus, there is no need for high-voltage (HV) lead acid batteries as in AC UPSs. The topology according to the present disclosure can be used for Tier 2, Tier 3, and Tier 4 systems in an N+1 configuration.

Figure 20A:
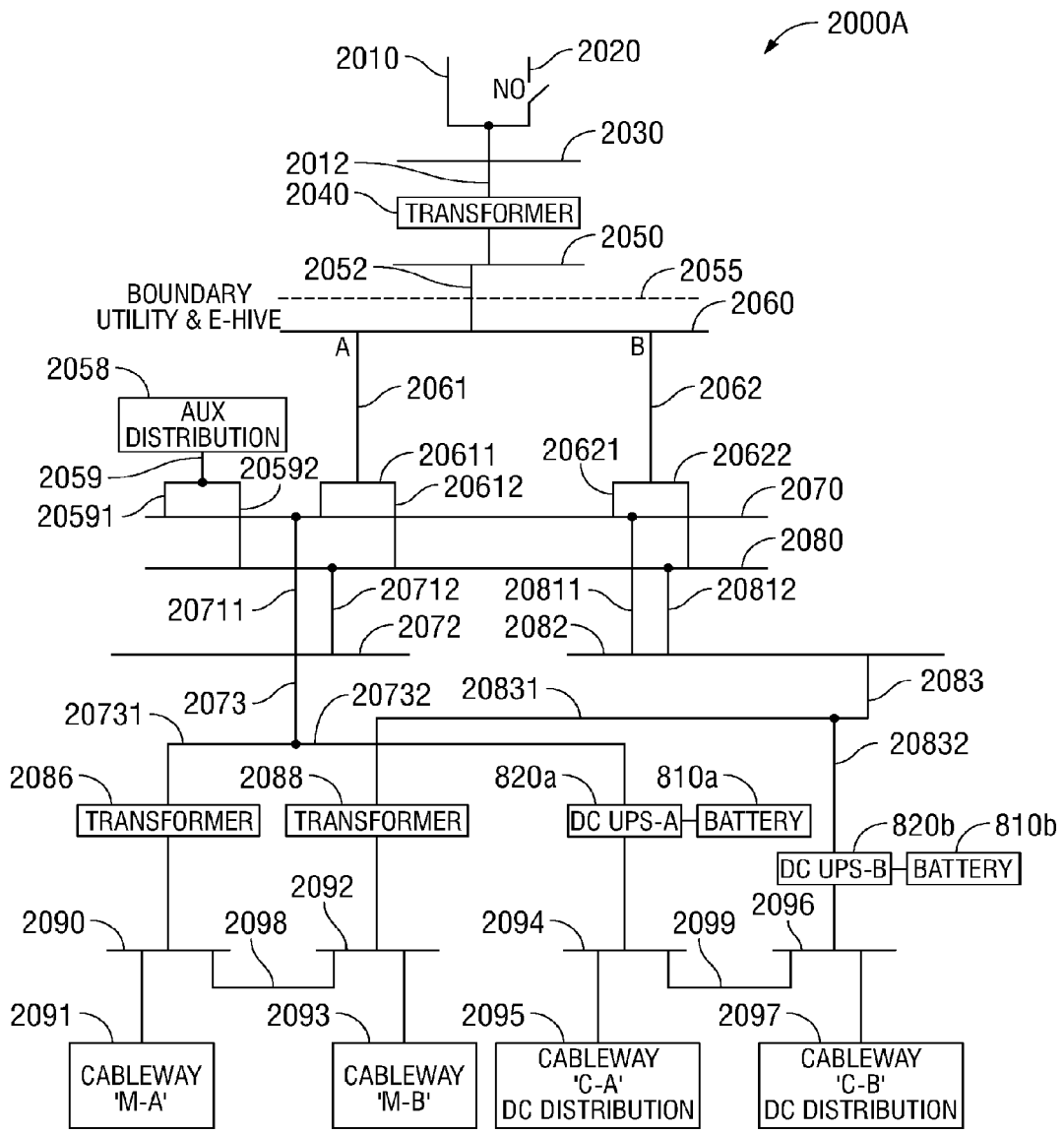
FIG. 20A is a schematic illustration of one embodiment of the present disclosure (FIG. 19) of the bus power arrangement of a modular data pod powered by two utility power feeders in which on-line DC UPSs are located in between intermediate level buses and cable distribution buses.
Figure 20B:
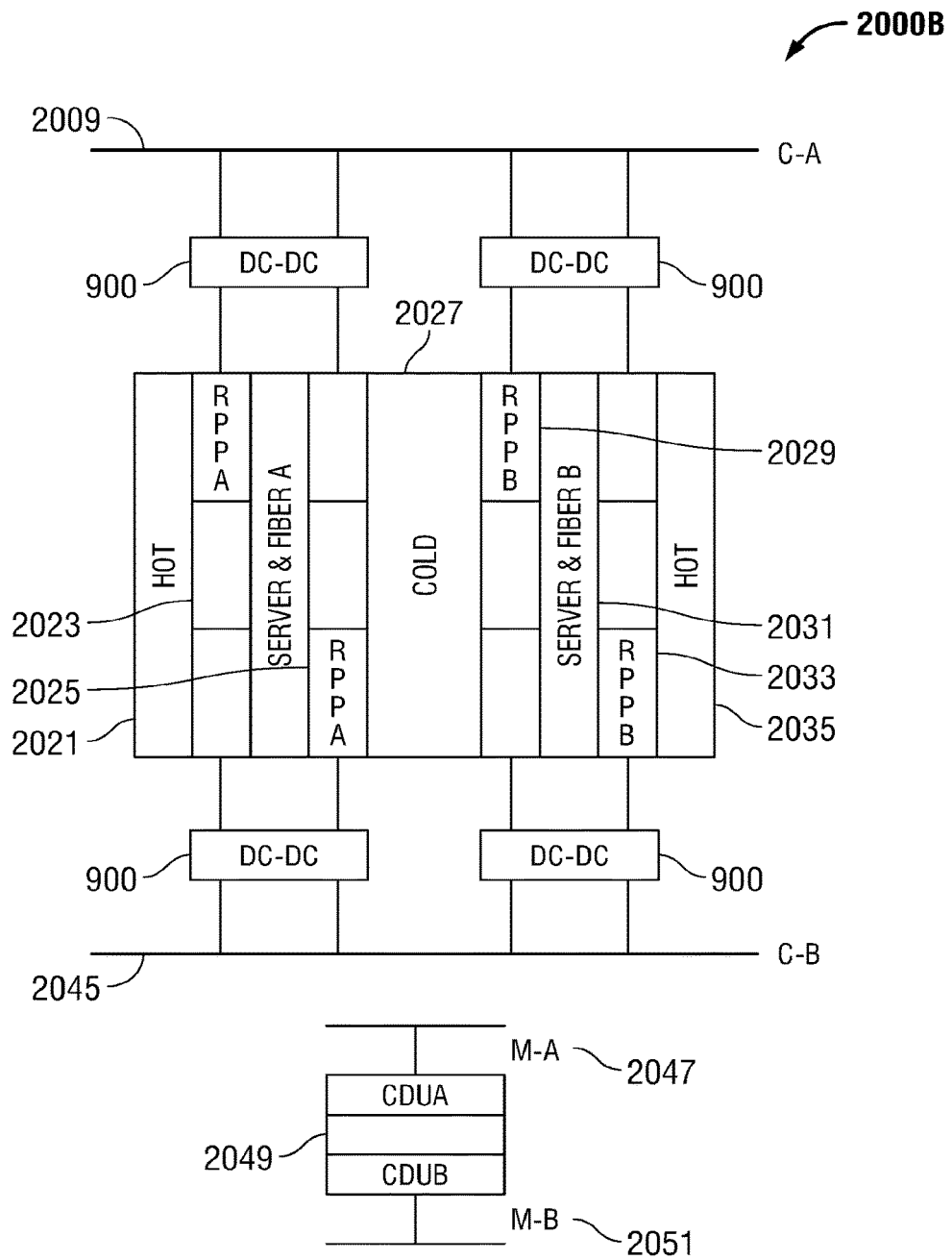
FIG. 20B is a continuation of the schematic illustration of FIG. 20A in which on-line single DC-DC power converters supply power directly to IT server loads of a modular data pod.
Figure 21:
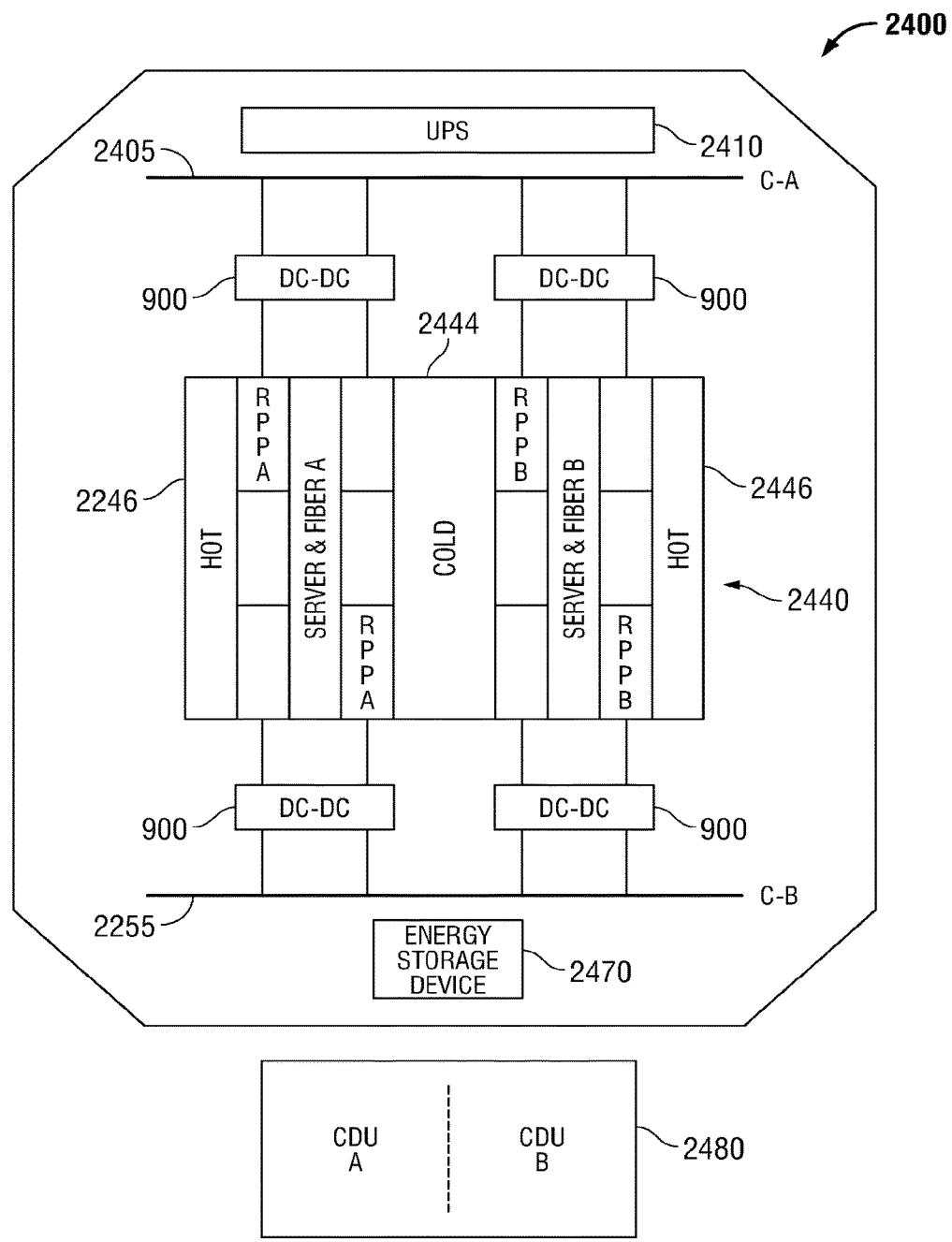
FIG. 21 illustrates the main components of a modular data modular data pod having a UPS and single conversion DC-DC converters supplying power to IT server loads according to one embodiment of the present disclosure.

FIGS. 20A and 20B are schematic diagrams of the bus power arrangement and data centers having modular DC UPS-A 820*a* and DC UPS-B 820*b*, respectively (see FIG. 11). DC UPSs A and B (820*a* and 820*b*) supply power to respective IT loads via respective DC-DC converters 900, as shown in FIGS. 20B and 21. Buses C-A, C-B (2009, 2045) connect to each server via respective DC-DC converter 900 of server power supply 800.

In particular, DC UPS A, 820*a* and DC-UPS B, 820*b* in FIG. 20A are on both feeder lines 2010, 2020 and supply power to the servers with a DC input voltage.

During normal operation, the IT loads and the mechanical loads of data center 2000 are powered entirely either by the utility power feeders 1 or 2 (2010, 2020) via on-line single conversion DC UPSs A, B (820*a*, 820*b*). The utility power source is usually connected to the data center 2000B through the first utility power feeder 1 (2010). The second utility power feeder 2 (2020) is normally open (NO) via switch 2022 and supplies the data center load (both IT and mechanical loads) in case the first utility power feeder 1 (2010) malfunctions. A transformer 2040 steps down the voltage from the utility power feeders 1 and 2 (2010, 2020) through bus tie 2032 to main switchgear 2050. A utility switchgear 2030 is positioned between the feeder lines 2010, 2020 and the transformer 2040. Additionally, a main switchgear 2050 and a critical input switchgear 2060 are electrically coupled through tie 2052 and are positioned between the transformer 2040 and the DC UPSs A, B (820*a*, 820*b*). DC UPS A 820*a* includes an energy storage device 810*a*, whereas DC UPS B 820*b* includes energy storage device 810*b*. Bus 2070 is electrically coupled to critical distribution switchgear 2072 via tie 20711 and to switchgear 2082 via tie 20811. Bus 2080 is electrically coupled to critical distribution switchgear 2072 via tie 20712 and to switchgear 2082 via tie 20812.

Critical distribution switchgear 2072 is electrically coupled to mechanical load transformer 2086 via tie 2073 and split tie 20731 and to cableway "C-A" DC Distribution 2095 via bus 2094 via tie 2073 and split tie 20731.

Similarly, critical distribution switchgear 2082 is electrically coupled to mechanical load transformer 2088 via tie 2083 and split tie 20831 and to cableway "C-B" DC Distribution 2097 via bus 2096 and tie 2083 and split tie 20832.

The IT loads (2023, 2025, 2029, 2031, 2033) are supplied via on-line DC UPS (820*a*, 820*b*). Each UPS, 820*a*, 820*b* has sufficient capacity to handle the entire IT load alone in case of failure of the other. However, UPS 820*a*, 820*b* generally work in combination, each carrying 50% of the load. The DC UPS batteries 810*a*, 810*b* are recharged by the utility power feeder via step-down transformer 2040. An auxiliary distribution source 2058 supplies power to the loads upon failure of the DC UPSs A and B (820*a*, 820*b*). The power is supplied from auxiliary distribution source 2058 via ties 2059 to and split tie 20591 to output switchgear 2070 and via split tie 20592 to output switchgear 2080.

Mechanical load transformers (2086, 2088) supply power to the mechanical (CDU) load 2049 (see FIG. 20B) via switch gears 2090, 2092. Either transformer 2086, 2088 has sufficient capacity to handle the entire mechanical load alone in case of failure of the other. If either transformer 2086, 2088 fails, then power is supplied to cableways M-A or M-B (2091, 2093) via cross-tie 2098 between switchgear 2090 and 2092. Mechanical load transformers 2086, 2088 are connected to the source via a first critical distribution switchgear 2072 and a second critical distribution switchgear 2082, as well as output switchgears 2070 and 2080.

Either cableway 2095, 2097 (C-A or C-B) has sufficient capacity to handle the entire IT load alone in case of failure of the other. However, cableways 2095, 2097, 2091, and 2093 generally work in combination, each carrying 50% of the load. However, cableways C-A and C-B (2095, 2097) are usually used for IT loads, whereas mechanical cableways M-A and M-B (2091, 2093) are usually used for mechanical/CDU loads 2049. Bus 2094 to cableway C-A (2095) can be cross-tied to bus 2096 and cableway C-B (2097) via cross-tie 2099.

FIG. 20B illustrates connections between buses M-A, M-B (2047, 2051) and mechanical/CDU loads 2049, and between buses C-A, C-B (2009, 2045) and IT loads. IT loads include a plurality of server rack assemblies (2023, 2025, 2029, 2031, 2033), which are separated from each other via cold aisles 2027. Additionally, the plurality of server rack assemblies (2023, 2025, 2029, 2031, 2033) are enclosed within hot aisles 2021, 2035. Each server rack assembly (2023, 2025, 2029, 2031, 2033) is electrically coupled to cableways C-A, C-B (2009, 2045) via server power supplies 900 (see FIG. 20B).

FIG. 21 illustrates a modular data pod 2400 having a DC UPS 2410 that includes an AC-DC converter (not shown, but is part of the DC UPS 2410) and an energy storage device 2470. The energy storage device 2470 may be a low voltage, lithium-ion battery. For example, the battery may provide 24 or 48 V. The DC UPS 2410 includes a plurality of AC inputs from each of the buses 2072 and 2082 (see FIG. 20A). The outputs from the AC-DC converter of DC UPS 2410 are supplied to the energy storage device 2470.

The server power supply 900 has been described above with respect to FIG. 12 and has been shown in FIGS. 20B and 21, which includes two DC inputs 840*a* and 840*b* from respective feed buses. The DC-DC converter 900 supplies a plurality of different DC voltages to the IT loads/servers 2440. DC-DC converter 900 converts the input DC voltage into multiple low DC voltages 920*a* . . . 920*d*. For example, DC-DC converter 900 can supply approximately 3.3 VDC, 5 VDC, 12 VDC and −12 VDC to the server as shown.

FIG. 21 illustrates the main components of modular data pod 2400 according to one embodiment of the present disclosure. IT loads include a plurality of server rack assemblies 2440, which are separated from each other via a cold aisle 2444. Additionally, the plurality of server rack assemblies 2440 are enclosed within hot aisles 2446. Each server rack assembly 2440 is electrically coupled to buses C-A, C-B (2405, 2255) via server power supplies 900 as described above.

Figure 6:
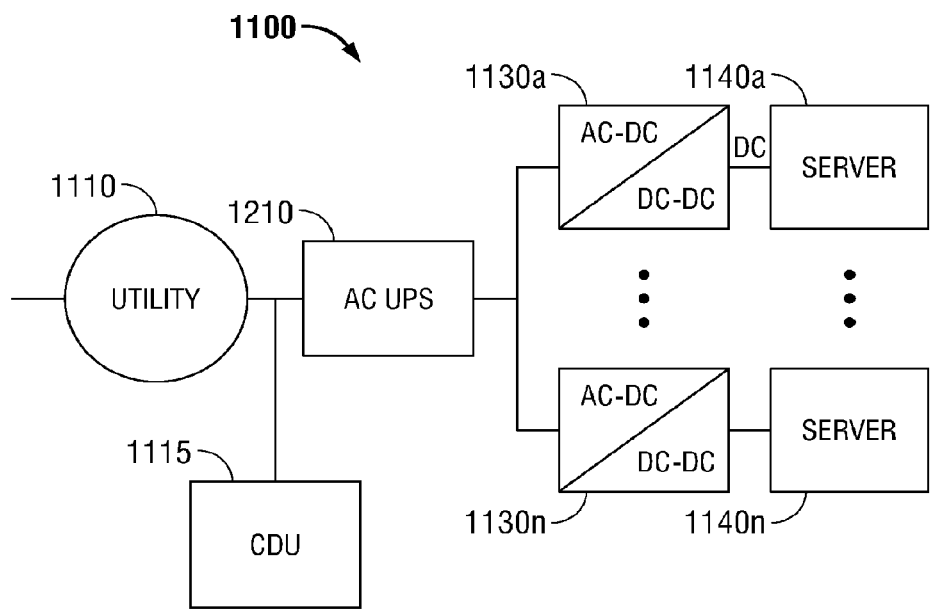
FIG. 6 is a schematic illustration of a conventional modular data center powered by a 3-phase AC utility feed (400 or 480 V AC) and centralized AC UPS.
Figure 7:
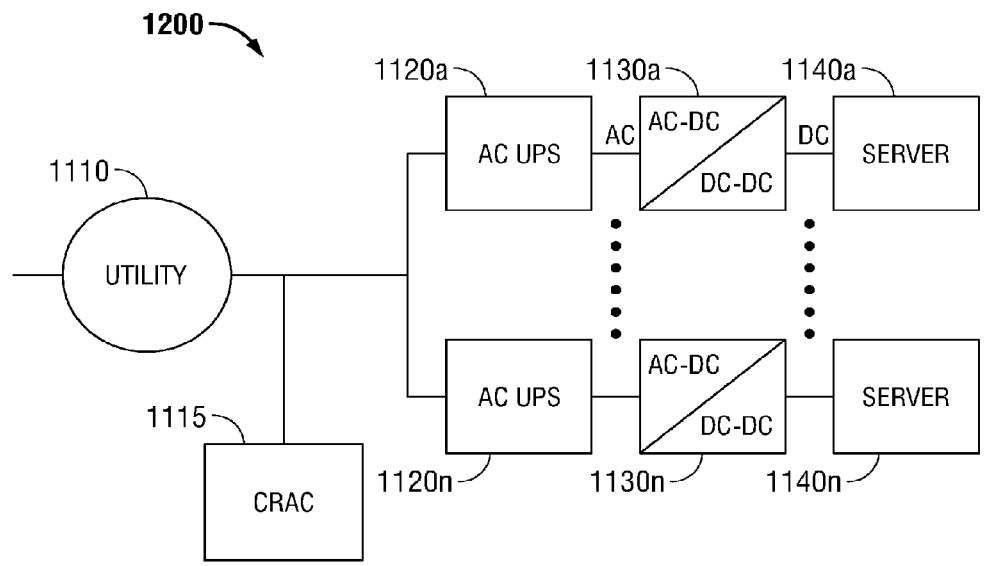
FIG. 7 illustrates another conventional modular data center powered by a utility feed wherein each IT load is powered by separate and distinct modular single-phase AC UPSs.
Figure 8:
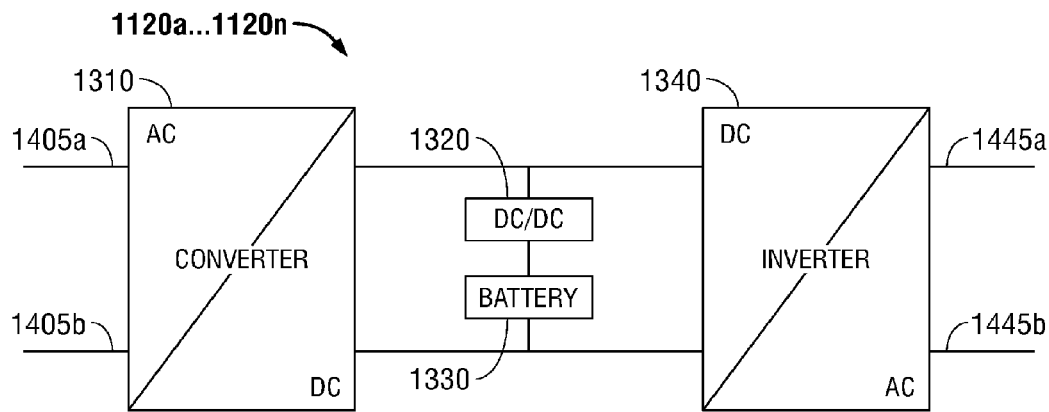
FIG. 8 illustrates a block diagram of a single-phase double conversion on-line AC UPS as illustrated in FIG. 7.

Some advantages of the modular data center 2400 over prior art modular data centers 1100, 1200 (FIGS. 6 and 7), is that data center 2400 eliminates the need for less efficient double conversion AC UPSs. Furthermore, a high energy density, long life, Li-ion battery may be used in place of a low density, reduced life, lead-acid battery, as space is an issue with modular data centers. Thus, efficiency improvement is achieved because of the use of an AC UPS in ES mode with AC distribution (Topology-1) or the use of a single conversion DC UPS with Hybrid (both AC and DC)

distribution (Topology-2). Furthermore, electrical losses are reduced and efficiency is improved because of the use of the single-stage conversion of a server power supply with a DC input voltage. Moreover, efficiency of the server power supply is improved due to the use of a ZVS technique with compact high switching and a high efficiency planar transformer. Also, a low-voltage battery may be used for a DC UPS, such as a Lithium-ion battery, which improves battery life and energy density compared to lead-acid batteries.

The use of modular DC UPSs and server power supplies with DC input voltage leads to higher efficiency, lower capital investment and lower operating energy costs. This topology can also be easily scalable based on the required load. The UPS system disclosed herein occupies less floor space due to its modular design. The modular data center designs can be used for Tier-2, Tier-3, and Tier-4 in N+1 configurations.

The following Table shows an approximate percentage of electrical efficiency improvement at rated loads for the modular data center 2400.

| at Rated Load | AC UPS in on-line double conversion mode & Server power supply with AC input (Existing Art) | AC UPS in Energy Saver mode & Server power supply with AC input (Topology-1) | Hybrid Distribution: DC UPS & Server power supply with DC input (Topology-2) |
|---|---|---|---|
| UPS Crictical | 95% | 99% | 97.50% |
| UPS Mechanical | 95% | 99% | 99.00% |
| PS - AC/DC Section | 94% | 94% | |
| PS - DC/DC Section | 93% | 93% | 94% |
| Overall Efficiency | 78.90% | 85.68% | 90.73% |
| Efficiency Improvement | | 6.78% | 11.84% |

The power system according to the present disclosure may be used in large MW power applications by connecting them in parallel. The power system may also be used in applications across the full power spectrum from small to very large power applications. The urban data center is benefited from this power system as it occupies less floor space.

Figure 22:
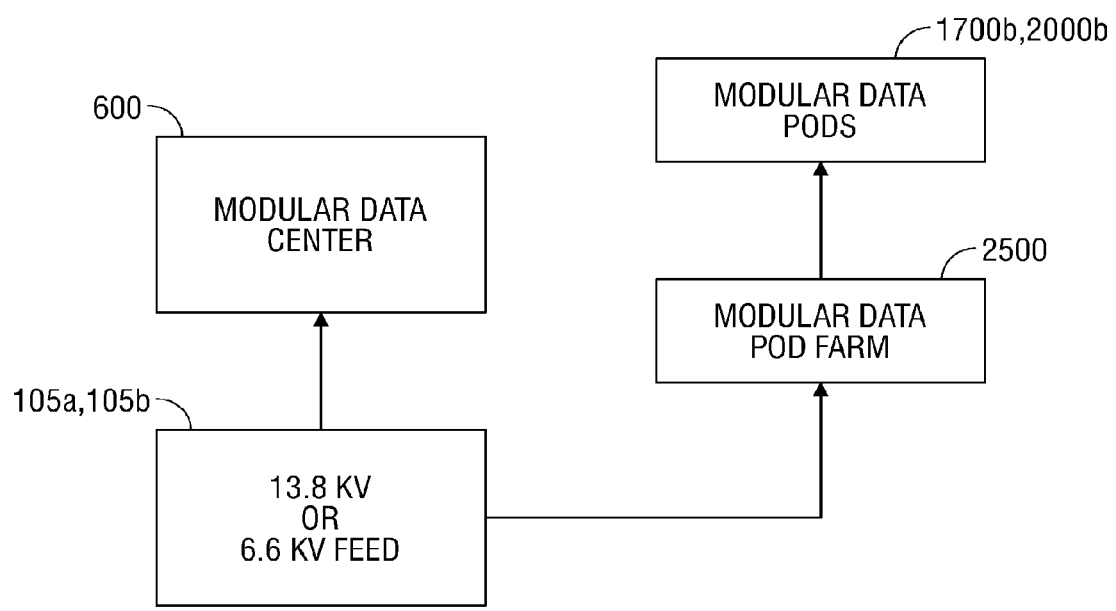
FIG. 22 illustrates a comparison between the bus power arrangement of a modular data center and a modular data pod farm in which a 13.8 KV or a 6.6 KV bus feed is supplied to both a modular data center and the modular data pod farm according to one embodiment of the present disclosure.

FIG. 22 illustrates a comparison between the bus power arrangement of the modular data center 600 and a modular data pod farm 2500 in which 13.8 KV or 6.6 KV bus feeds as utility feed lines 105*a* and 105*b* are supplied to both the modular data center 600 and the modular data pod farm 2500 that includes modular data pods 1700B or 2000B according to one embodiment of the present disclosure to provide similar efficiency improvements to the prior art modular data center 600 as are applied to the modular data farm 2500 via the embodiments of the present disclosure.

Figure 23:
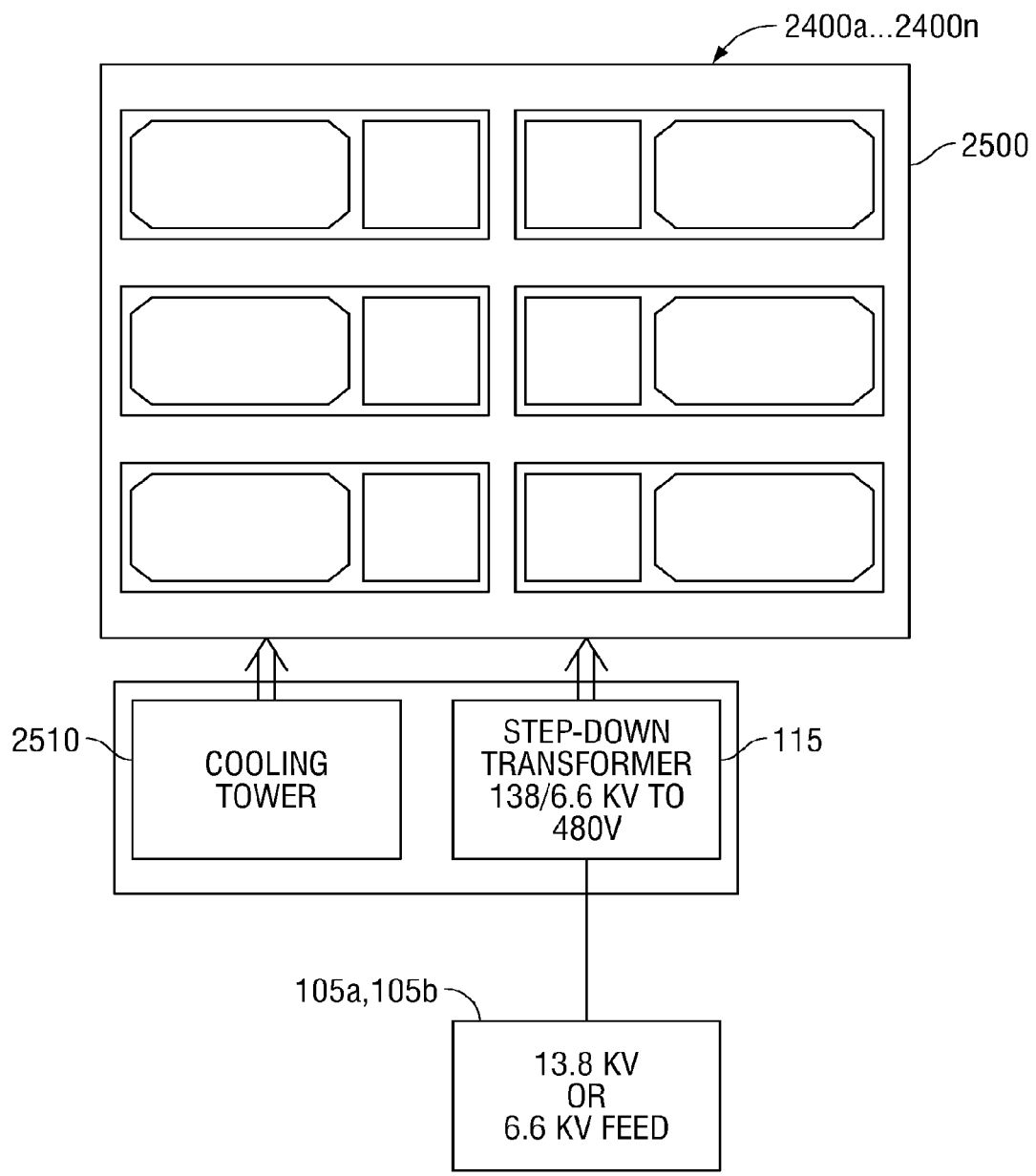
FIG. 23 is a more detailed schematic illustration of the bus power arrangement of FIG. 22 which shows only the 13.8 KV or a 6.6 KV bus feed supplied to the modular data pod farm in which a step-down transformer is included within the modular data pod farm.

FIG. 23 is a more detailed schematic illustration of the bus power arrangement of FIG. 22 which shows only the 13.8 KV or a 6.6 KV bus feeds 105*a* or 105*b* supplied only to the modular data pod farm 2500 in which step-down transformer 115 is included within the modular data pod farm 2500. The modular data pod farm 2500 includes cooling tower 2510 and individual data pods 2400*a* . . . 2400*n* that are illustrated in FIG. 21 as modular data pod 2400.

The electrical systems and methods for the modular data centers and modular data pods according to the present disclosure are further described in "Efficient Data Center design using Novel Modular DC UPS, Server Power supply with DC voltage and Modular CDU cooling," by Subrata Mondal and Earl Keisling, published in the 2012 IEEE International Conference on Power Electronics, Drives and Energy Systems, Dec. 16-19, 2012, Bengaluru, India, E-ISBN 978-1-4673-4508-8, ©2012 IEEE, which is hereby incorporated by reference.

While several embodiments of the disclosure have been shown in the drawings and/or discussed herein, it is not intended that the disclosure be limited thereto, as it is intended that the disclosure be as broad in scope as the art will allow and that the specification be read likewise. Therefore, the above description should not be construed as limiting, but merely as exemplifications of particular embodiments. Those skilled in the art will envision other modifications within the scope and spirit of the claims appended hereto.

What is claimed is:

1. A system for supplying power to a data center including a plurality of server rack assemblies and a plurality of cooling distribution units (CDUs) in thermal communication with the plurality of server rack assemblies, the system comprising:
an electric generator;
an AC UPS electrically coupled between the electric generator and the plurality of CDUs; and
a plurality of DC UPSs, each of which is electrically coupled between the electric generator and a respective one of the plurality of server rack assemblies.

2. The system according to claim 1, wherein each of the plurality of DC UPSs includes an AC-DC converter and an energy storage device electrically coupled in parallel to an output of the AC-DC converter.

3. The system according to claim 2, wherein the energy storage device is a low-voltage battery.

4. The system according to claim 3, wherein the low-voltage battery is a 12 V battery, a 24 V battery, or a 48 V battery.

5. The system according to claim 2, wherein the energy storage device is a lithium-ion battery or a combination of a lithium-ion battery and a ultra-capacitor.

6. The system according to claim 2, wherein each of the plurality of DC UPSs further includes a high-frequency DC-DC converter for a power supply of at least one server in a respective server rack assembly, and
wherein the high-frequency DC-DC converter includes a plurality of MOSFETs and a zero-voltage switching controller electrically coupled to the plurality of MOSFETs to output a plurality of DC voltages from the high frequency DC-DC converter.

7. The system according to claim 6, wherein a single power conversion is performed between the energy storage device and the at least one server in the respective server rack assembly.

8. The system according to claim 1, wherein the AC UPS is configured in an offline energy saver mode such that power is supplied from the AC UPS to the plurality of CDUs if a disturbance occurs in a utility power source that normally supplies power to the plurality of CDUs.

9. The system according to claim 8, wherein the AC UPS includes:
an AC-DC converter;
an energy storage device and a bidirectional DC-DC converter electrically coupled in series with a positive terminal of the energy storage device, the series combination of the energy storage device and the DC-DC converter being coupled in parallel to the AC-DC converter; and a DC-AC inverter electrically coupled in parallel to the series combination of the energy storage device and the DC-DC converter.

10. The system of claim 9, wherein the energy storage device is a medium voltage battery.

11. The system of claim 10, wherein the medium voltage battery supplies voltage between 250 V and 450 V.

12. The system of claim 8, wherein each of the plurality of DC UPSs is connected to a respective load line of a plurality of load lines.

13. The system of claim 8, wherein one of the plurality of DC UPSs is connected to one load line of a plurality of load lines.

14. The system of claim 1, wherein each of the plurality of DC UPSs is connected to a respective load line of a plurality of load lines.

15. The system of claim 1, wherein one of the plurality of DC UPSs is connected to one load line of a plurality of load lines.

* * * * *